(12) United States Patent
Rebeschi et al.

(10) Patent No.: US 10,649,554 B2
(45) Date of Patent: *May 12, 2020

(54) PEN FOR CAPACITIVE TOUCH SYSTEMS

(71) Applicant: 3M INNOVATIVE PROPERTIES COMPANY, St. Paul, MN (US)

(72) Inventors: Thomas J. Rebeschi, Merrimack, NH (US); Craig A. Cordeiro, Westford, MA (US); Bernard O. Geaghan, Salen, NH (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,563

(22) Filed: Jul. 17, 2019

(65) Prior Publication Data

US 2019/0339795 A1 Nov. 7, 2019

Related U.S. Application Data

(63) Continuation of application No. 15/727,663, filed on Oct. 9, 2017, now Pat. No. 10,379,633, which is a continuation of application No. 14/558,771, filed on Dec. 3, 2014, now Pat. No. 9,817,491.

(60) Provisional application No. 61/924,382, filed on Jan. 7, 2014.

(51) Int. Cl.
    *G06F 3/0354* (2013.01)
    *G06F 3/044* (2006.01)
    *G06F 3/041* (2006.01)

(52) U.S. Cl.
    CPC .......... *G06F 3/03545* (2013.01); *G06F 3/044* (2013.01); *G06F 3/0416* (2013.01)

(58) Field of Classification Search
    CPC ..... G06F 3/03545; G06F 3/0416; G06F 3/044
    See application file for complete search history.

(56) References Cited

U.S. PATENT DOCUMENTS

| 2004/0169439 A1 | 9/2004 | Toda |
| 2008/0150918 A1 | 6/2008 | Hagen et al. |
| 2012/0013555 A1 | 1/2012 | Maeda et al. |
| 2012/0062497 A1 | 3/2012 | Rebeschi et al. |

*Primary Examiner* — Shaheda A Abdin
(74) *Attorney, Agent, or Firm* — Jonathan L. Tolstedt

(57) ABSTRACT

A pen configured for use with a touch sensor includes a pen tip that is configured to make contact with the touch sensor. The pen body includes an electrically conductive receiver portion and an electrically conductive emitter portion that is electrically insulated and electrostatically shielded from the receiver portion. The pen includes circuitry configured to receive a touch sensor drive signal applied to a drive electrode of the touch sensor through the receiver portion of the pen body. In response to the received signal, the pen circuitry generates a pen drive signal that is phase additive with the touch sensor drive signal and emits the pen drive signal through the emitter portion of the pen body.

8 Claims, 13 Drawing Sheets

PEN FOR CAPACITIVE TOUCH SYSTEMS

TECHNICAL FIELD

This disclosure relates generally to touch-sensitive devices, particularly those that rely on a capacitive coupling between a user's finger or other touch implement and the touch sensor.

BACKGROUND

Touch-sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon displayed on the display.

Capacitive touch-sensing devices have been found to work well in a number of applications. In many touch-sensitive devices, the touch input is sensed when a conductive object in the sensor is capacitively coupled to a conductive touch implement such as a pen (also referred to as a stylus) or a user's finger. Generally, whenever two electrically conductive members come into proximity with one another without actually touching, a capacitance is formed therebetween. In the case of a capacitive touch-sensitive device, as an electrically conductive object approaches and/or touches the touch sensing surface, changes in capacitance occurs at the touch location and the sensing circuit can be configured to determine the touch location based on the change in capacitive coupling. In some embodiments, the sensing circuit can recognize that multiple objects are concurrently touching the touch surface and can determine the locations of the objects as they move across the touch surface.

BRIEF SUMMARY

Some embodiments disclosed herein are directed to a pen for use with a touch sensor. The pen includes a pen tip that is configured to make contact with the touch sensor. The pen body includes an electrically conductive receiver portion and an electrically conductive emitter portion that is electrically insulated and electrostatically shielded from the receiver portion. The pen includes circuitry configured to receive a touch sensor drive signal applied to a drive electrode of the touch sensor through the receiver portion of the pen body. In response to the received signal, the pen circuitry generates a pen drive signal that is phase additive with the touch sensor drive signal and emits the pen drive signal through the emitter portion of the pen body.

Some embodiments include a pen for use with a touch sensor, wherein the pen includes a pen body and pen circuitry disposed at least partially within the pen body. The pen circuitry includes receiver circuitry configured to receive a synchronization signal from the touch sensor. Signal generator circuitry generates a pen drive signal based on the synchronization signal, the pen drive signal includes a code that identifies the pen. The pen circuitry also includes emitter circuitry configured to emit the pen drive signal. The pen configured to capacitively couple the pen drive signal to a receive electrode of the touch sensor when the pen touches the touch sensor proximate to the receive electrode.

In some embodiments, the pen circuitry is configured to emit a first pen drive signal through a first emitter portion of the pen body and to emit a second pen drive signal having a phase opposite to the first pen drive signal through a second emitter portion of the pen body.

Some embodiments involve a method of operating a pen configured to capacitively couple with a touch sensor. The pen includes a pen body having an electrically conductive receiver portion and an electrically conductive emitter portion that is electrically insulated and electrostatically shielded from the receiver portion. A touch sensor drive signal that is applied to at least one drive electrode of the touch sensor is received by the pen through the receiver portion of the pen body. A pen drive signal is generated from the touch sensor drive signal. The pen drive signal is phase additive with the touch sensor drive signal. The pen drive signal is emitted through the emitter portion of the pen body.

Some embodiments involve a system that includes a pen and a touch sensor. The touch sensor includes a matrix of drive and receive electrodes capacitively coupled at a plurality of nodes. Touch sensor drive circuitry is configured to generate touch sensor drive signals and to apply the touch sensor drive signals to the drive electrodes. Touch sensor detection circuitry is configured to detect a touch based on response signals present on the receive electrodes. The touch sensor also includes pen synchronization circuitry configured to provide a synchronization signal. A pen useable with the touch sensor generates a pen drive signal based on the synchronization signal.

Some embodiments are directed to a method of operating a pen configured to capacitively couple with a touch sensor. Operating the pen includes receiving a synchronization signal from the touch sensor and generating a pen drive signal based on the synchronization signal. The pen emits the pen drive signal. The pen drive signal includes a code that identifies the pen.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DESCRIPTION OF ILLUSTRATIVE EMBODIMENTS

Figure 1:
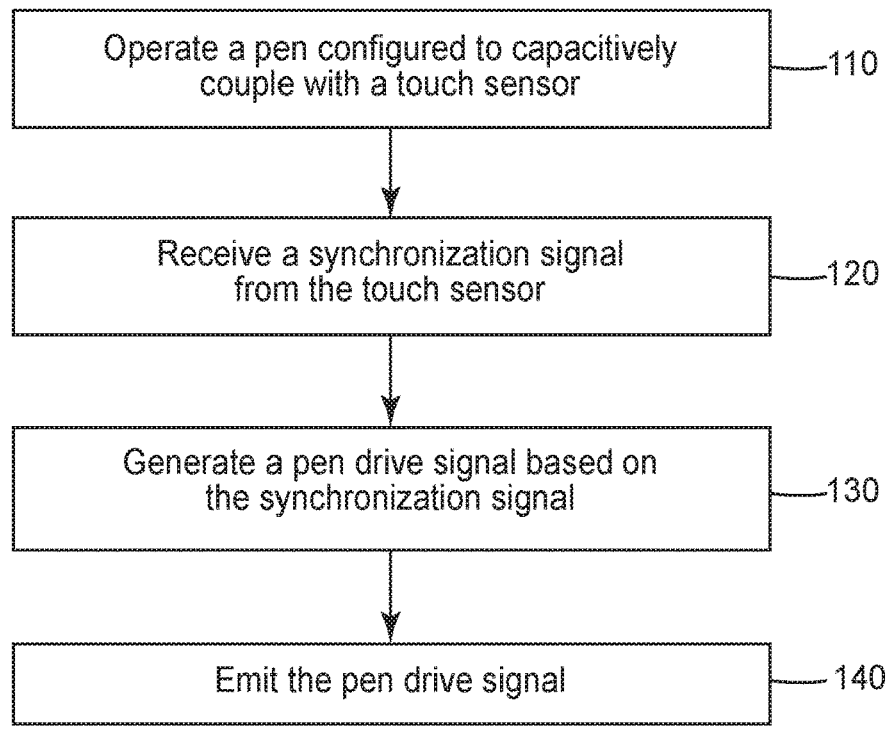
FIG. 1 illustrates a process of operating a pen configured for use with a touch sensor.

Embodiments described herein involve a pen for use with a capacitive touch sensor. The touch sensor includes a matrix of drive and receive electrodes arranged so that the drive electrodes are capacitively coupled to the receive electrodes. A touch sensor includes a touch sensor controller that is electrically coupled to the drive and receive electrodes. The controller applies drive signals to the drive electrodes, e.g., in a sequential pattern. The touch sensor controller senses the response signals carried by the receive electrodes and analyzes the response signals to determine a location of a touch on the touch sensor.

A finger touch has a subtractive effect on a touch response signal of the system. As discussed in embodiments below, an active pen may be configured to add to the touch response signal or to subtract from the response signal of the system. The difference in the touch response signal amplitude for a finger and an active pen can be used to allow the system to distinguish a finger touch from a pen touch, for example. In some embodiments, each pen may also be configured produce the touch response signal that includes an associated code that identifies the pen.

The pen (also referred to as a stylus) is physically separate from the touch sensor and may be electrically connected to the touch sensor. The pen includes a pen body having a pen tip that is configured to make contact with the touch sensing surface and a grip portion configured so that a user can grip the pen and direct the pen tip into close proximity and/or contact at the desired touch point on the touch sensing surface. The pen may also contain a switch that activates the pen when the tip is pressed against the touch surface.

In embodiments described herein, the pen body may at least partially enclose electronic circuitry of the pen. The electronic circuitry is configured to receive a synchronization signal from touch sensor. The synchronization signal includes information about the frequency and phase of the touch sensor drive signal. In some implementations, the synchronization signal may be the touch sensor drive signal. In some implementations, the synchronization signal may be a modification of the touch sensor drive signal. For example, the synchronization signal may comprise a carrier signal that is amplitude modulated by the touch sensor drive signal.

In embodiments discussed herein, the components configured to receive the synchronization signal can range from relatively simple to relatively more complex. For example in a simple tethered case, the receiver circuitry may be a wired connection between the pen and the touch system. Or, a relative simple untethered pen may employ amplification of the synchronization signal. In more complex cases, the receiver circuitry can comprise circuitry configured to receive synchronization signals via an RF link, or circuitry to emulate the timing of touch screen scanning circuits.

The pen electronic circuitry generates a signal that is phase additive with the touch sensor drive signal based on the synchronization signal. Processes involved in generating the pen drive signal may range from relatively simple to more complex. For example, in a relatively simple case, generating the signal involves amplifying or boosting a signal. A more complex signal generator reconstructs a waveform based on received information. The pen circuitry emits the pen drive signal.

In some embodiments, the pen body comprises an electrically conductive receiver portion and an electrically conductive emitter portion. The emitter portion is electrically insulated and electrostatically shielded from the receiver portion. The electronic circuitry of the pen is configured to receive a touch sensor drive signal that is applied to a drive electrode of the touch sensor through the receiver portion of the pen body. The electronic circuitry is configured to generate a pen drive signal that is phase additive with the touch sensor drive signal and to emit the pen drive signal through the emitter portion of the pen body.

According to some embodiments, the pen drive signal includes a code that identifies the pen. The code can include a sequence of pulses of two different phases or two or more different amplitudes, wherein the sequence of pulses is associated with or is unique to a particular pen.

The flow diagram of FIG. 1 illustrates a process of operating 110 a pen configured for use with a touch sensor. The pen has a pen body comprising an electrically conductive receiver portion and an electrically conductive emitter portion that is electrically insulated and electrostatically shielded from the receiver portion. The pen is configured to capacitively couple with the touch sensor when the pen touches or comes into close proximity with the touch sensing surface at a receive electrode of the touch sensor. A synchronization signal is received 120 by the pen through the receiver portion of the pen body. In some configurations, the synchronization signal is a touch sensor drive signal applied to at least one drive electrode of the touch sensor that is received through the receiver portion of the pen body. A pen drive signal that is phase additive with the touch sensor drive signal is generated 130 based on the synchronization signal. The pen drive signal is emitted 140 through the emitter portion of the pen body.

Figure 2:
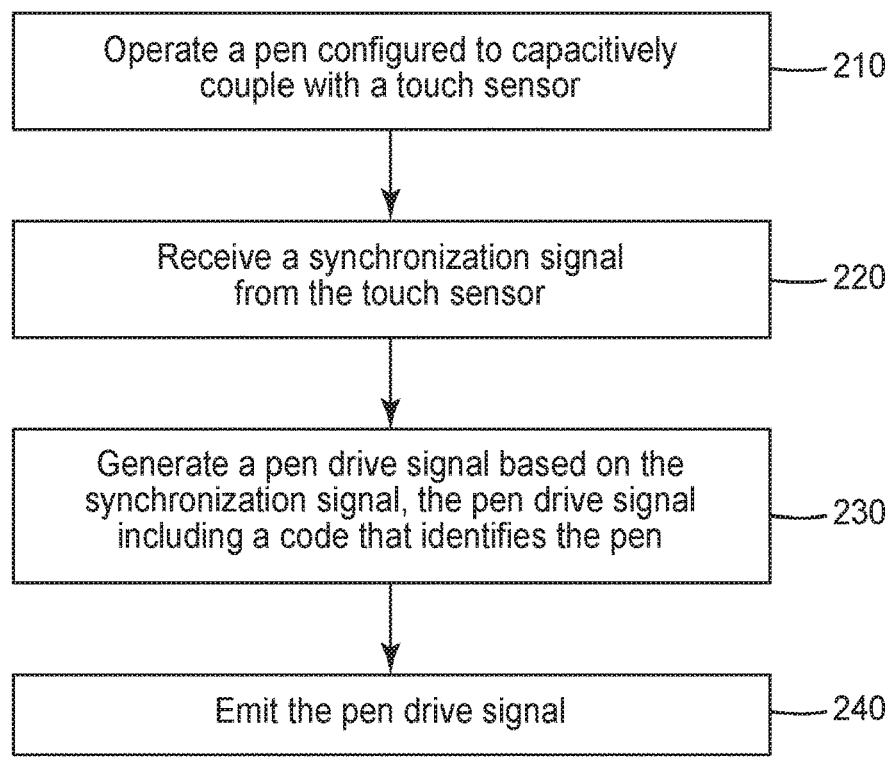
FIG. 2 is a flow diagram that illustrates another process of operating a pen for use with a touch sensor.

FIG. 2 is a flow diagram that illustrates another process of operating 210 a pen for use with a touch sensor according to some embodiments. The pen is configured to capacitively couple with a touch sensor when the pen is proximate to a receive electrode of the touch sensor. A synchronization signal is received 220 from the touch sensor through the receiver portion of the pen body. A pen drive signal is generated 230 based on the synchronization signal and is emitted 240 by the pen. The pen drive signal may include a code sequence that identifies the pen.

Figure 3:
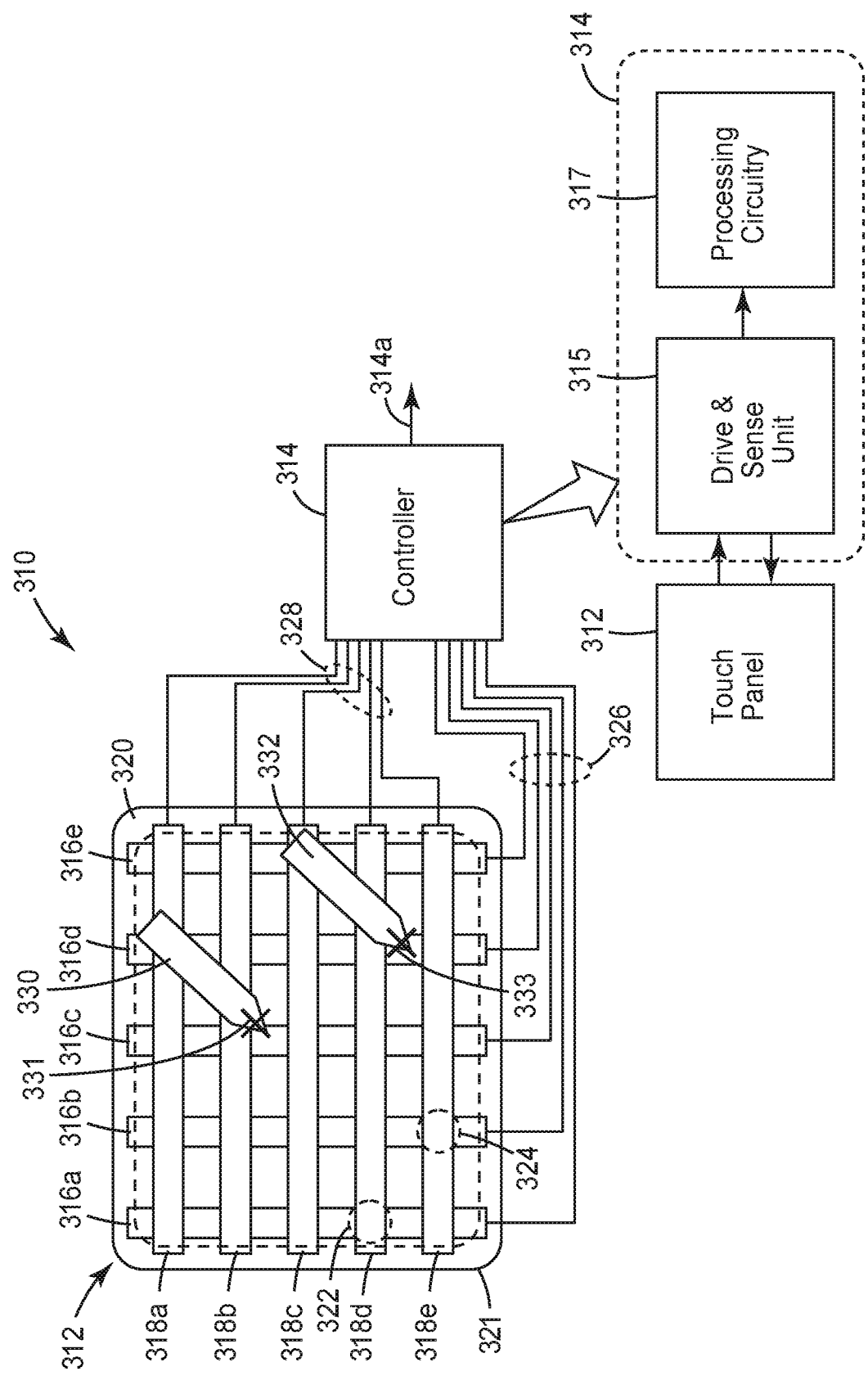
FIG. 3 depicts an exemplary touch sensor.

Turning now to FIG. 3, an exemplary touch sensor 310 is shown. The sensor 310 includes a touch panel 312 connected to electronic circuitry, which for simplicity is grouped together into a single schematic box labeled 314 and referred to collectively as a controller. The controller 314 comprises a analog pulse driver, and signal receiver, an ADC converter and a data processor or other circuitry configured to perform various processes described herein.

The touch panel 312 is shown as having a 5×5 matrix of column electrodes 316a-e and row electrodes 318a-e, but other numbers of electrodes and other matrix sizes can also be used. The panel 312 is typically substantially transparent so that the user is able to view an object, such as the pixilated display of a computer, hand-held device, mobile phone, or other peripheral device, through the panel 312. The boundary 320 represents the viewing area of the panel 312 and also the viewing area of such a display, if used. The electrodes 316a-e, 318a-e are spatially distributed, from a plan view perspective, over the viewing area 320. For ease of illustration the electrodes are shown to be wide and obtrusive, but in practice they may be relatively narrow and inconspicuous to the user. Further, they may be designed to have variable widths, e.g., an increased width in the form of a diamond- or other-shaped pad in the vicinity of the nodes of the matrix in order to increase the inter-electrode fringe field and thereby increase the effect of a touch on the row and column electrode-to-electrode capacitive coupling.

In exemplary embodiments the electrodes may be composed of indium tin oxide (ITO) or other suitable electrically conductive materials. From a depth perspective, the column electrodes may lie in a different planes than the row electrodes such that no significant ohmic contact is made between column and row electrodes, and so that the only significant electrical coupling between a given column electrode and a given row electrode is capacitive coupling. From the perspective of FIG. 3, the column electrodes 116a-e lie underneath the row electrodes 318a-e. The matrix of electrodes typically lies beneath a cover glass, plastic film, or the like, so that the electrodes are protected from direct physical contact with a user's finger or other touch-related implement. An exposed surface of such a cover glass, film, or the like may be referred to as a touch sensing surface.

The capacitive coupling between a given row and column electrode is primarily a function of the geometry of the electrodes in the region where the electrodes are closest together. Such regions correspond to the "nodes" of the electrode matrix, some of which are labeled in FIG. 3. For example, capacitive coupling between column electrode 316a and row electrode 318d occurs primarily at node 322, and capacitive coupling between column electrode 316b and row electrode 318e occurs primarily at node 324. The 5×5 matrix of FIG. 3 has 25 such nodes, any one of which can be addressed by controller 314 via appropriate selection of one of the control lines 326, which individually couple the respective column electrodes 316a-e to the controller 314, and appropriate selection of one of the control lines 328, which individually couple the respective row electrodes 318a-e to the controller 314.

The controller 314 includes circuitry configured to generate and apply drive signals to a first set of electrodes of the touch panel and to receive signals from a second set of electrodes. For example, in some configurations, the drive electrodes may be the column electrodes 316a-316e and the receive electrodes may be the row electrodes 318a-318e, although it is also possible that the column electrodes may be used as receive electrodes and the row electrodes may be used as drive electrodes. In some implementations, the controller electronics applies drive signals to the drive electrodes sequence, e.g., starting with electrodes 316a and progressing to electrode 316e, although it is possible to a variety of patterns for applying drive signals to the drive electrodes. As the drive signals are applied to the drive electrodes, the controller 314 senses signals on the receive electrode.

When a touch implement 330, such as pen or a finger comes into contact or near-contact with the touch sensing surface of the sensor 310, as shown at touch location 331, the touch implement 330 capacitively couples to the electrode matrix. If the touch implement is a finger (or a passive touch implement), the finger draws charge from the matrix, especially from those electrodes lying closest to the touch location, and in doing so it changes the coupling capacitance between the drive and receive electrodes corresponding to the nearest node(s). For example, the touch at touch location 331 lies nearest the node corresponding to electrodes 316c/318b. A finger or passive touch implement decreases the capacitive coupling between the receive and drive electrodes nearest the node.

If the touch implement is active and is driven with a signal, the signal is capacitively coupled to the matrix and the signal of the touch implement operates to change the effective capacitive coupling between the drive and receive electrodes corresponding to the nearest node. If the signal from the touch implement is subtractive with respect to the drive signal, the signal draws charge from proximate touch sensor electrodes nearby and decreases the effective capacitive coupling between the drive and receive electrodes at the node. If the signal from the touch implement is additive with respect to the drive signal, the signal adds charge to the proximate touch sensor electrodes nearby increases the effective capacitive coupling between the drive and receive electrodes at the node.

As described further below, the change (increase or decrease) in effective capacitive coupling can be detected by controller 314 and interpreted as a touch at or near affected node, e.g., the 316c/318b node shown in FIG. 3. The controller 314 can be configured to rapidly detect the changes in effective capacitive coupling, if any, of all of the nodes of the matrix, and is capable of analyzing the magnitudes of the changes for neighboring nodes so as to accurately determine a touch location lying between nodes by interpolation.

Furthermore, the controller 314 may be designed to detect multiple distinct touches applied to different portions of the touch device at the same time, or at overlapping times. Thus, for example, if another touch implement 332 touches the touch surface of the device 310 at touch location 333 simultaneously with the touch of implement 330, or if the respective touches at least temporally overlap, the controller 314 may be capable of detecting the positions 331, 333 of both such touches and providing such locations on a touch output 314a. The number of distinct simultaneous or temporally overlapping touches capable of being detected by controller 314 is not limited to 2, e.g., it may be 3, 4, or more, depending on the size of the electrode matrix. In at least some of the disclosed embodiments the number of temporally overlapping touches capable of being detected equals the number of nodes in the electrode matrix.

As discussed further below, the controller 314 may employ a variety of circuit modules and components that enable it to rapidly determine the coupling capacitance at some or all of the nodes of the electrode matrix. Note that the changes in effective capacitive coupling can be determined by measuring any suitable parameter or quantity whose value depends on the coupling capacitance.

As discussed previously, the controller may include one or more signal generators that form part of a drive unit 315. The drive unit 315 delivers drive signals from the signal generators to one set of electrodes, referred to as drive electrodes. In the embodiment of FIG. 3, the column electrodes 316a-e may be used as drive electrodes, or the row electrodes 318a-e may be so used. In some embodiments, the drive unit 315 delivers multiple drive pulses to one of the drive electrodes at a time. For example, the drive unit 315 may deliver a first drive signal to a first drive electrode, then sequentially delivering a second set of drive pulses to a second drive electrode, and so on delivering a third set of drive pulses to a third drive electrode, and so forth. While the drive signals are applied, the controller 314 may monitor one, some, or all of the other set of electrodes, referred to as receive electrodes.

The controller 314 may, for example, include one or more sense units 315 coupled to the receive electrodes. A given sense unit receives a response signal (also referred to as a receive signal) from a given receive electrode, the response signal contains the signal component of the drive signal frequency. The sense unit 315 may amplify, filter, or otherwise condition the receive signal so that the amplitude of the signal component, which is responsive respectively to the coupling capacitances between the receive electrode and the various drive electrodes that are being driven, can be measured by processing circuitry 317 that includes a measurement unit. The measurement unit may utilize a filter and summing technique to measure the respective amplitudes of the various signal components, which amplitudes are responsive to the coupling capacitance at the nodes defined by the receive electrode and the various drive electrodes that are being driven, and thus also responsive to the touch status of such nodes. The sense unit 315 may sense the response signals from all of the sense electrodes in this manner and the processing circuitry 317 measures their respective signal components in the same way. After all such measurements have been made, the processing circuitry 317 can compare the signal component amplitude measurements to stored reference values for each of the nodes in order to generate a map of which nodes, if any, have experienced a change in coupling capacitance due to the presence of a touch. The stored reference values may be measurements of the coupling capacitances made previously for each of the nodes in the absence of any touches and can be a normalized running average of each node.

A touch sensor controller may also include one or more analog-to digital converters (ADCs) to convert signals from an analog format to a digital format. Digital-to-analog converters (DACs) may also be used, for example in one or more drive units to convert digital values to an analog drive signal. One or more multiplexers and switches may also be used to avoid unnecessary duplication of circuit elements. In some cases, the controller includes one or more memory devices in which to store the measured amplitudes and associated parameters, and a microprocessor to perform the necessary calculations and control functions. In some cases the controller, and/or other portions of the touch device, can also embody one or more application-specific integrated circuits (ASICs), application specific standard products (ASSPs), or the like, to carry out one or more of the functions described herein.

A touch may be identified when the capacitve coupling on a node is effectively reduced or increased by a passive or active touch implement. In some embodiments, for a finger touch, a signal at a receive electrode indicative of the capacitive coupling from the finger touch is compared to the untouched signal level. When the signal at a node of the receive electrode goes below a touch threshold, a touch is detected and a touch coordinate is output.

If the touch implement is a pen, the pen may be passive or active. A passive pen does not emit a pen drive signal. An active pen emits a pen drive signal that is capacitively coupled to the touch sensor. A passive pen acts similarly to a finger and subtracts charge from a node causing a decrease in the response signal. A touch by a passive pen is indicated when the lower touch threshold for the response signal is reached.

An active pen may emit a signal that is subtractive with respect to the touch drive signal. When a subtractive pen drive signal is capacitively coupled to a receive electrode, the subtractive pen drive signal subtracts from the touch drive signal that is also capacitively coupled to the receive electrode. For example, the subtractive touch drive signal may have the same frequency and be 180° out of phase with respect to the touch drive signal. A touch is detected when the response signal is decreased compared with the untouched signal level, similar to a finger touch.

An active pen may emit a signal that is additive with respect to the touch drive signal. When an additive pen drive signal is capacitively coupled to a response electrode, the additive pen drive signal adds to the touch drive signal that is also capacitively coupled to the receive electrode. For example, the additive touch drive signal may have the same frequency and phase as to the touch drive signal. A touch is detected when the response signal is increased compared to the untouched signal level. In some embodiments, the touch sensor controller may be configured to differentiate between a finger touch and a phase additive active pen touch based on the amplitude of the touch sensor response signal. Additional information regarding touch controller circuitry and techniques for determining touch information is discussed in U.S. Patent Publication US 20120062497 which is incorporated by reference herein in its entirety.

As described herein, the pen drive signal can be generated based on a synchronization signal from the touch sensor. The synchronization signal can be transferred to the pen through a wired or wireless electrical connection between the touch sensor controller and pen. The synchronization signal includes information about the frequency and phase of the touch drive signals generated by the touch sensor. In some configurations, the synchronization signal may be the touch drive signals. For example, the pen may be configured to sense a touch drive signal applied to a drive electrode when the pen is brought near to the touch sensing surface. The sensed touch drive signal serves as the synchronization signal for the pen.

In one example, the touch sensor controller may include pen synchronization circuitry configured to sum the touch drive signals applied to each drive electrode sequentially and to provide the summed touch drive signals to the pen through a wired connection. In another example, the pen synchronization circuitry in the touch controller may include radio frequency (RF) amplitude modulation (AM) circuitry configured to modulate an RF carrier signal with the touch drive signal. In this example, the pen would include compatible demodulator circuitry to demodulate the RF touch drive signal.

Figure 4A:
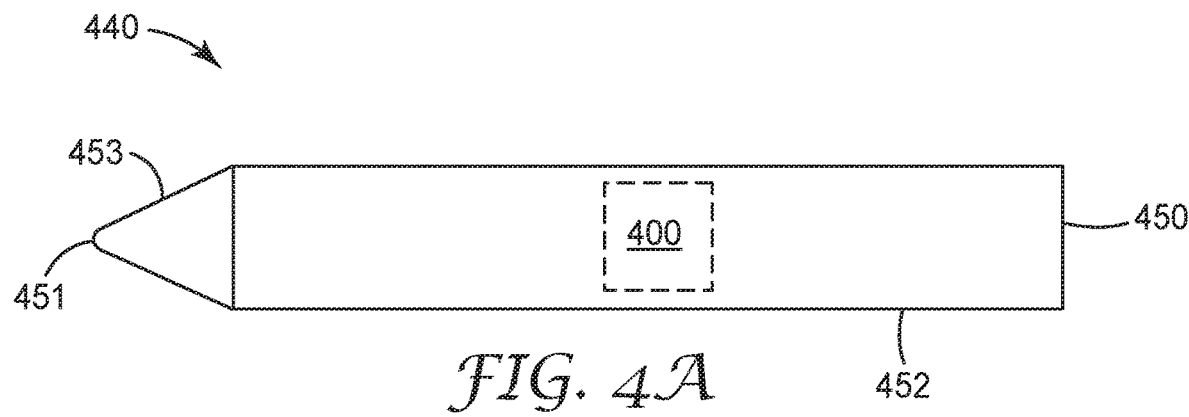
FIG. 4A illustrates a pen for use with the touch sensor of FIG. 3.
Figure 4B:
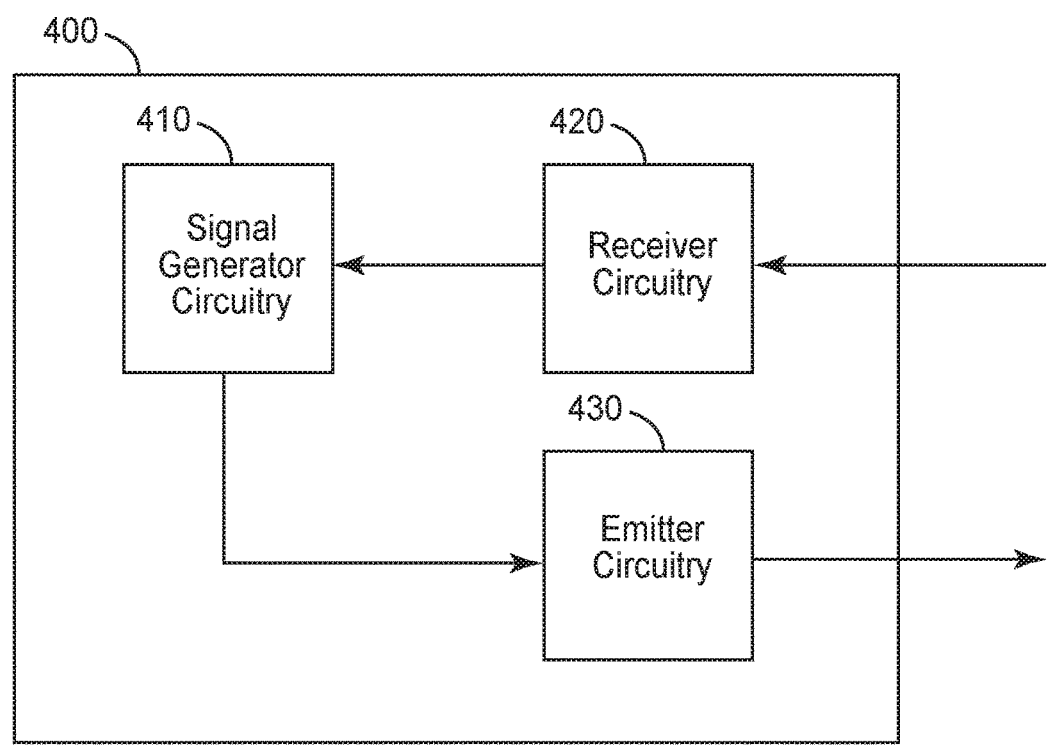
FIG. 4B is a block diagram of the pen circuitry of the pen of FIG. 4A.

FIG. 4A shows an exemplary touch pen 440 comprising a pen body 450 that includes a tip 451 configured to make contact with the touch sensing surface of the touch sensor, a main region 452, and a transition region 453, e.g., cone between the pen tip 451 and the main region 452. The main region 452 includes a gripping region that allows the user to grip and manipulate the pen. In some embodiments, the gripping region encompasses less than all the area of the main region 452. The active pen 440 includes electronic circuitry 400 that receives a synchronization signal and generates the pen drive signal. The electronic circuitry 400 may be disposed partially or fully within the pen body 450. As shown in FIG. 4B, the electronic circuitry 400 includes receiver circuitry 420 configured to receive a synchronization signal from the touch sensor through a wired or wireless connection, signal generator circuitry 410 configured to generate the pen drive signal based on the synchronization signal, and emitter circuitry 430 configured to emit the pen drive signal.

Figure 5A:
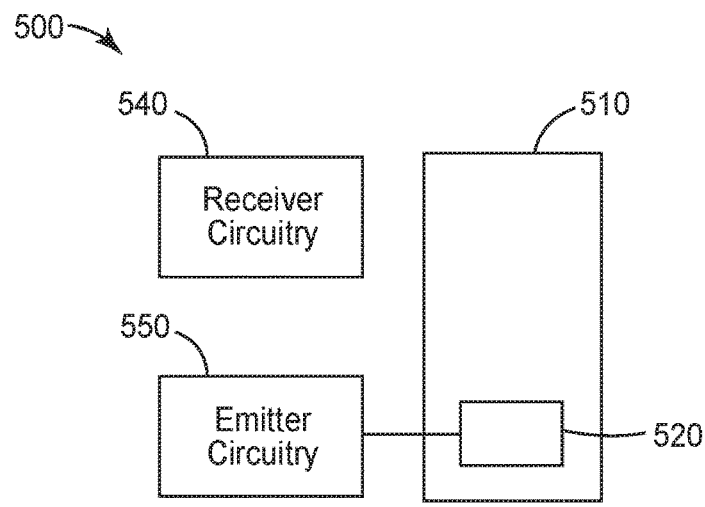
FIG. 5A illustrates a pen configured for use with a touch sensor, the pen body having an electrically conductive emitter portion that is coupled to the emitter circuitry of the pen.

As shown in FIG. 5A, a pen 500 configured for use with a touch sensor may include the pen body 510 having an electrically conductive emitter portion 520 that is coupled to the emitter circuitry 550 of the pen 500. In some configurations, the emitter portion 520 may include all or a portion of the pen tip, may include all or a portion of the transition region and/or may include a portion of the main region of the pen body, e.g. a portion of the main region that is nonoverlapping with the gripping region. The emitter circuitry 550 may be electrically coupled with the emitter portion 520 of the pen body 510 so that the pen drive signal is emitted through the electrically conductive emitter portion 520. As discussed in more detail in conjunction with FIG. 13, the emitter portion 520 may comprise first and second emitter portions. The emitter circuitry 550 can be configured to emit a first pen drive signal via the first emitter portion and to emit a second pen drive signal via the second emitter portion, wherein the second emitter signal may have a phase that is opposite to the phase of the first pen drive signal.

Figure 5B:
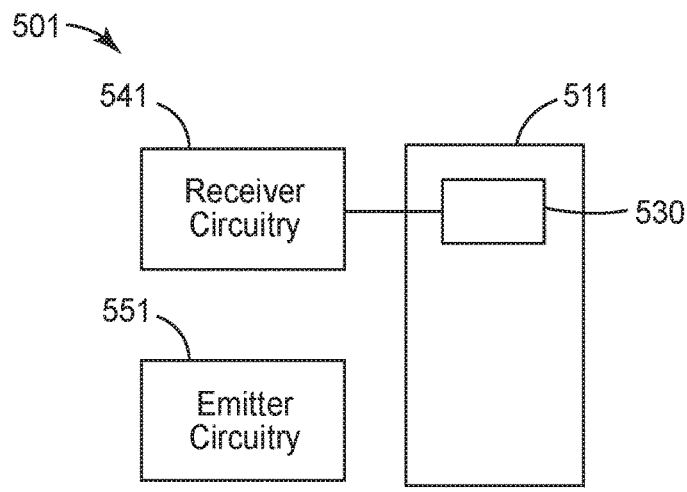
FIG. 5B depicts a pen configured for use with a touch sensor, the pen body having an electrically conductive receiver portion that is coupled to the receiver circuitry of the pen.

Optionally, as shown in FIG. 5B, a pen 501 configured for use with a touch sensor may include the pen body 511 having an electrically conductive receiver portion 530 that is coupled to the receiver circuitry 541 of the pen 501. In some configurations, the receiver portion 530 may include all or a portion of the pen tip, may include all or a portion of the transition region and/or may include a portion of the main region of the pen body, e.g. a portion of the main region that is nonoverlapping with the gripping region. The receiver circuitry 541 may be electrically coupled with the receiver portion 530 of the pen body 511 so that the synchronization signal is received through the electrically conductive receiver portion 530.

Figure 5C:
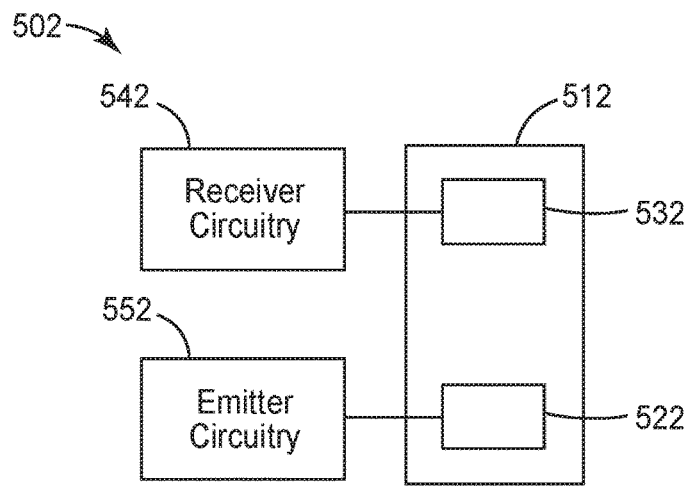
FIG. 5C shows a pen configured for use with a touch sensor, the pen body having an electrically conductive receiver portion that is coupled to the receiver circuitry and an electrically conductive emitter portion that is coupled to the emitter circuitry.

Yet another option, as shown in FIG. 5C, a pen 502 configured for use with a touch sensor may include the pen body 512 having an electrically conductive receiver portion 532 that is coupled to the receiver circuitry 542 and an electrically conductive emitter portion 522 that is coupled to the emitter circuitry 552. In various configurations, the receiver portion 532 may include all or a portion of the pen tip, may include all or a portion of the transition region and/or may include a portion of the main region of the pen body, e.g. a portion of the main region that is nonoverlapping with the gripping region. The emitter portion 522 may include all or a portion of the pen tip, may include all or a portion of the transition region and/or may include a portion of the main region of the pen body, e.g. a portion of the main region that is nonoverlapping with the gripping region. The gripping portion is electrically isolated from the emitter and receiver portions.

The receiver circuitry 542 may be electrically coupled with the receiver portion 532 of the pen body 512 so that the synchronization signal is received through the electrically conductive receiver portion 532. The emitter circuitry 552 may be electrically coupled with the emitter portion 522 of the pen body 512 so that the pen drive signal is emitted through the electrically conductive emitter portion 522. The emitter portion 522 is electrically insulated and electrostatically shielded from the receiver portion 532. In pens having an emitter portion that includes at least a portion of the transition region or the main region of the pen, the pen drive signal may change effective capacitance to a greater degree and/or over a larger area on the touch sensor than the tip, enhancing the touch signal.

In configurations wherein the pen body includes both an emitter portion and a receiver portion, these portions of the pen body are electrically isolated from one another by electrical insulation and an electrostatic shield. In some configurations, the emitter portion may include all or at least a portion of the pen tip and the receiver portion may include all or at least a portion of the cone transition region. Alternatively, the receiver portion may include all or at least a portion of the pen tip and the emitter portion may include all or at least a portion of the cone. In some configurations, the receiver portion may comprise a first portion of the tip and the emitter portion may include a second portion of the tip. In some configurations, the receiver portion may comprise a first portion of the cone and the emitter portion may include a second portion of the cone.

Figure 6:
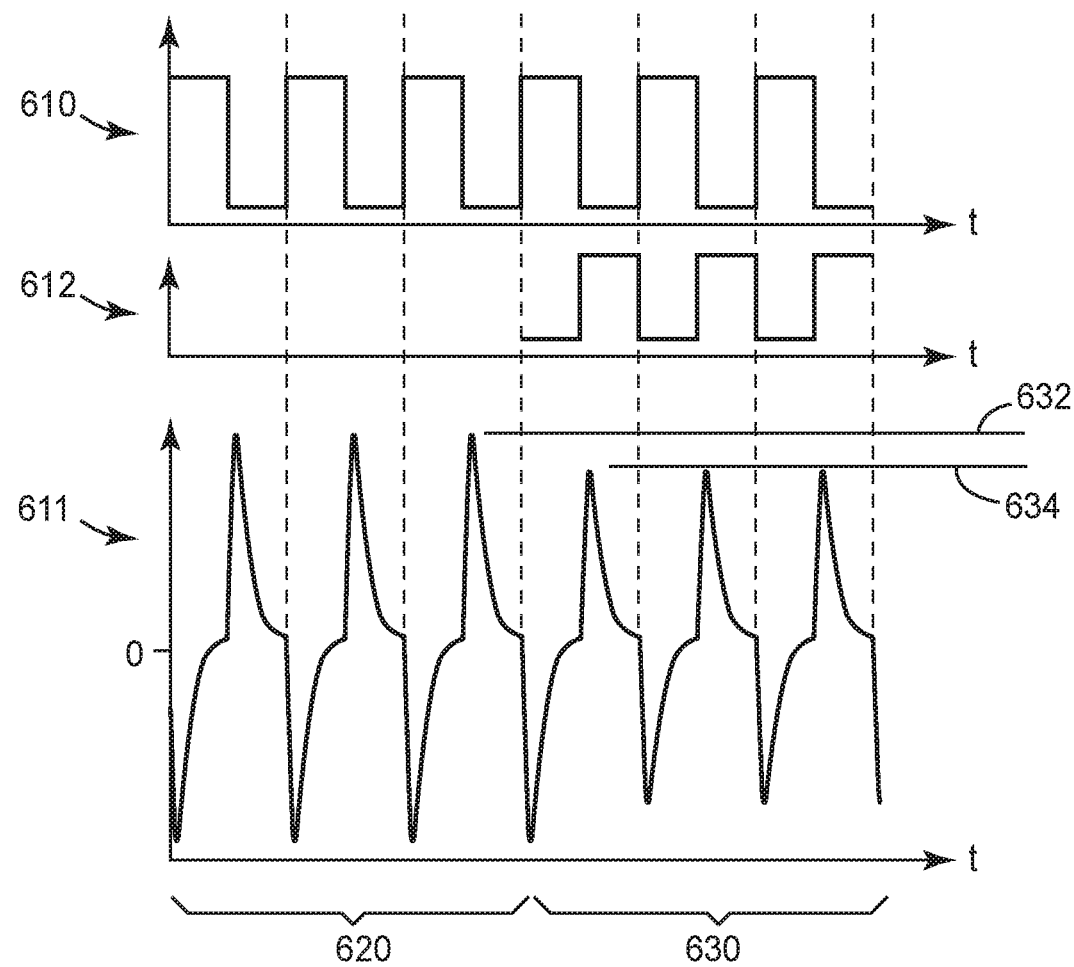
FIG. 6 depicts a voltage vs. time graph of a touch sensor drive signal and a corresponding voltage vs. time graph of a (modeled) touch sensor response signal.

FIG. 6 depicts a voltage vs. time graph of a touch sensor drive signal 610 and a corresponding voltage vs. time graph of a (modeled) touch sensor response signal 611 including portions 620, 630. The touch controller response signal 611 illustrates changes that may occur in the response signal 611 when a pen drive signal 612 that is phase subtractive with the touch sensor drive signal 610 is in close proximity to the touch sensing surface. The response signal 611 includes a no touch portion 620 (no touch present or near the relevant node of the touch sensor) and a touch portion 630 (a touch is present at or near the relevant node of the touch sensor). In the no touch portion 620, the amplitude 632 of the response signal 611 is above a touch threshold. The amplitude 634 of the touch portion 630 of the response signal 611 is below a touch threshold indicating that a touch has occurred. As described previously, a touch from a finger, a passive pen, or an active pen with an opposite phase of the touch sensor drive signal reduces capacitive coupling and decreases the amplitude of the response signal. A touch can be detected based on this drop in the amplitude of the response signal 611.

Figure 7:
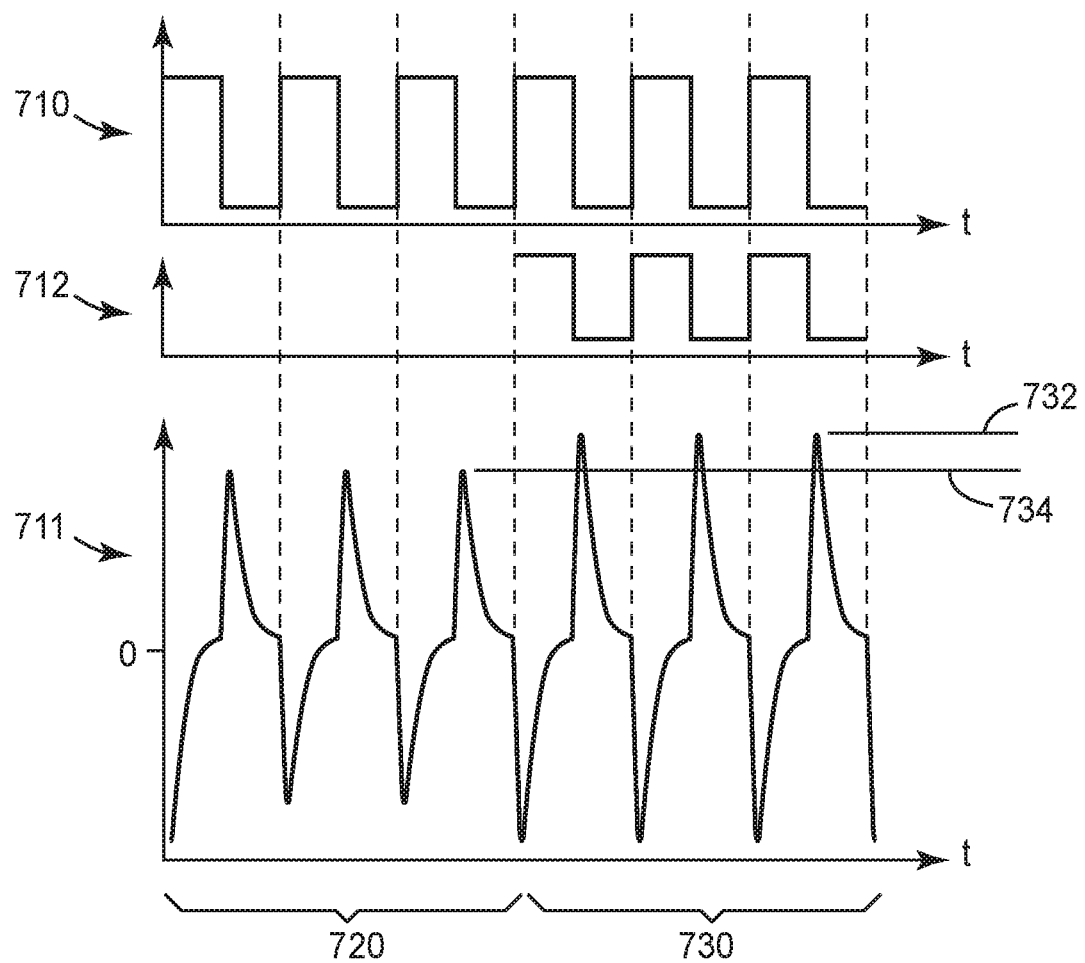
FIG. 7 shows a voltage vs. time graph of a touch sensor drive signal and a corresponding voltage vs. time graph of a response signal affected by an active pen touch with a pen drive signal having the same phase of the touch panel drive signal.

FIG. 7 shows a voltage vs. time graph of a touch sensor drive signal 710 and a corresponding voltage vs. time graph of a response signal 711 affected by an active pen touch with a pen drive signal 712 having the same phase of the touch panel drive signal. The response signal 711 includes a no touch portion 720 (no touch present at or near the node of the touch sensor) and a touch portion 730 (a touch is present at or near the node of the touch sensor). In the no touch portion 720, the amplitude 734 of the response signal is above a first touch threshold and below a second touch threshold. A response signal below the first touch threshold indicates that a finger touch, a passive pen touch, or a pen touch by an active pen having a subtractive phase pen drive signal has occurred.

In the touch portion 730 of the response signal 711, the amplitude 732 of the response signal 711 is above the second touch threshold, indicating the presence of a touch with an active pen having the same phase as the touch panel drive signal. The pen drive signal having the same phase as the touch sensor drive signal, has an additive effect on the response signal 711 in the touch portion 730 causing an increased amplitude due to an increase in the effective capacitive coupling between the drive and receive electrodes of the touch sensor.

According to some embodiments described herein, the pen drive signal includes a code that identifies the pen. The code can be used to differentiate different pens from one another. The code may allow multiple pens to be separately identified to be used concurrently with the same touch sensor.

In many touch systems, the touch controller implements a scan cycle for the drive electrodes by applying a drive signal pulse train sequentially to each drive electrode with a scan time interval between the pulse trains applied to different drive electrodes. There may be a refresh interval between successive scan cycles of the drive electrodes. In some implementations, the code is repeated in the pen drive signal for each drive signal applied to each of the scanned drive electrodes during a scan cycle, as discussed in connection with FIG. 8A. In other implementations, the code is transmitted in the pen drive signal over several scan cycles, e.g., one bit per cycle, as discussed in connection with FIG. 8B.

Figure 8A:
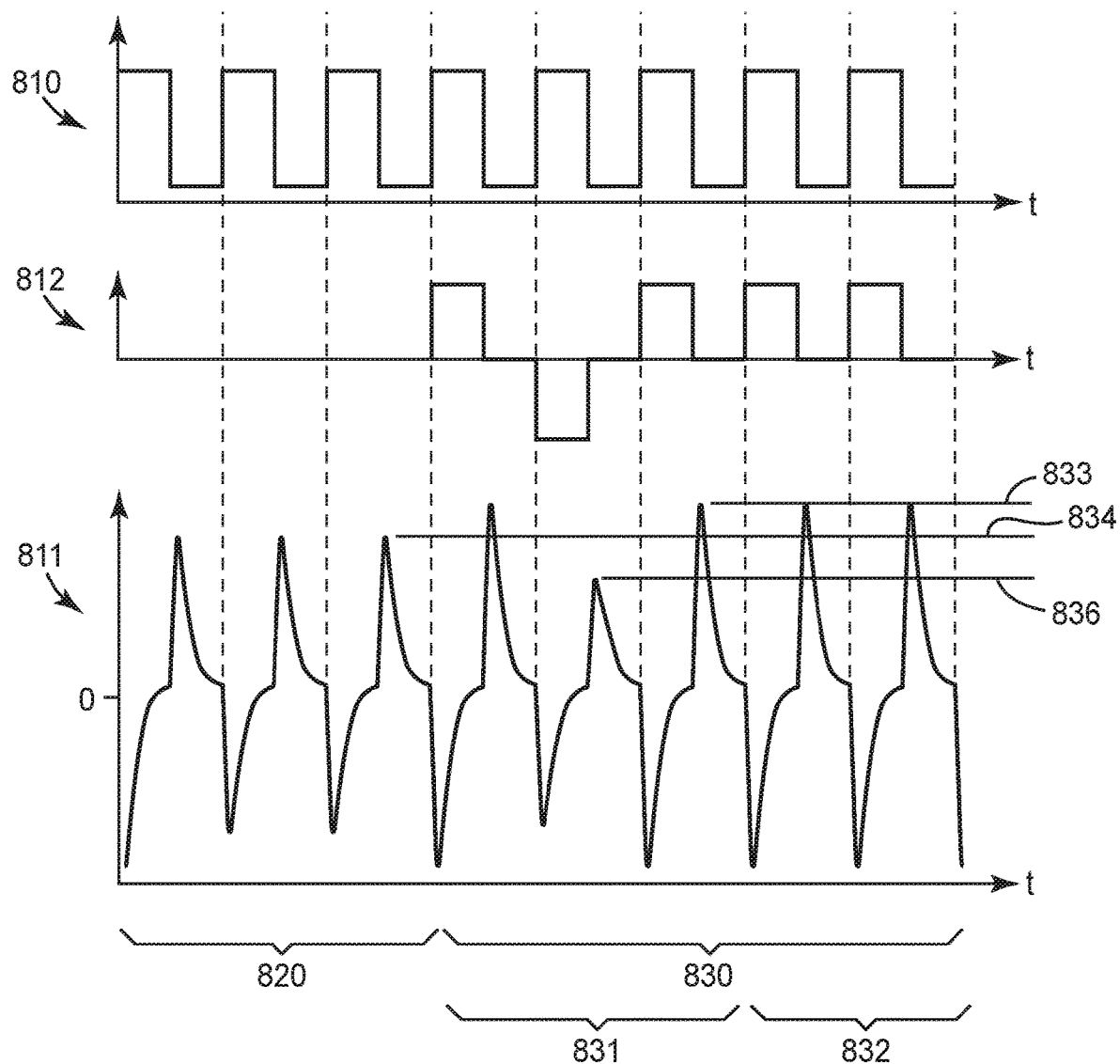
FIGS. 8A and 8B show voltage vs. time graphs of a touch sensor drive signal, a pen drive signal that includes a code identifying the pen, and a response signal affected by the pen drive signal.

FIG. 8A illustrates the approach wherein the code is repeated in the drive signal for each drive electrode that is scanned. FIG. 8A shows a voltage vs. time graph of a touch sensor drive signal 810 and a corresponding voltage vs. time graph of a response signal 811 affected by an active pen that emits a pen drive signal 812 that includes a code identifying the pen. In the no-touch portion 820 of the response signal 811, the response signal 811 has a first amplitude 834 indicative of the absence of a touch. The touch portion 830 of the response signal includes a code portion 831 and a drive portion 832 that are affected by the code portion 813 and a drive portion 814, respectively, of the pen drive signal 812.

In this example, the code portion 813 of the pen drive signal 812, includes a sequence of pulses in a phase additive, phase subtractive, phase additive sequence that can be used to identify the pen. In various embodiments, the encoding can be performed using two or more different pulse amplitudes in the pen drive signal. The pulses that contain the code are not limited to phase additive and phase subtractive pulses. For example the code portion of the pen drive signal could include phase additive pulses of two or more different amplitudes and/or could include phase subtractive pulses of two or more different amplitudes. In this example, the pulses in the drive portion 814 of the pen drive signal are phase additive, but phase subtractive pulses in the drive portion could alternatively be employed.

In the code portion 831 of the response signal 811, the response signal 811 includes a three pulse code sequence comprising a first pulse having amplitude 833, a second pulse having amplitude 836, and a third pulse having amplitude 834. A controller of the touch sensor may identify this pattern in the code portion 830 of the response signal 811 as being associated with a specific pen.

In some cases, the drive portion of the pen drive signal includes a sequence of pulses that are phase additive to a drive signal of the touch sensor and the code portion includes at least one pulse that is phase subtractive to the touch sensor drive signal. Alternatively, in some cases, the drive portion includes a sequence of pulses that are phase subtractive to a drive signal of the touch sensor and the code portion includes at least one pulse that is phase additive to the touch sensor drive signal. In some configurations, the drive portion includes a sequence of pulses that are phase subtractive or phase additive to a drive signal of the touch sensor and the code portion includes at least one pulse time period during which the pen neither adds nor subtracts from the touch sensor drive signal.

To identify the pen based on the code, the touch controller can be configured to measure each edge of the response signal and then output these measured signals to multiple decode blocks, each block matched to a particular pen code. The output of each of the decode blocks is a touch signal derived from the measured edges, matched to a particular pen. A decode block for a finger touch (or passive pen) would be matched to all subtractive pulses. For this reason, it is preferable that active pens do not emit codes with more zeros than ones, so the net effect of a single pen code sequence does not have a similar effect to a passive finger touch. In some implementations, it may be useful to use about a 50% additive/subtractive pulse sequence arranged into different codes.

In some implementations, the code sequence is emitted in the pen drive signal over several scan cycles of the drive electrodes. For example, one bit of the code may be emitted per scan cycle. As an example, consider first and second pens used with a touch sensor. The first pen is identified by code 10111 and the second pen is identified by code 10101. During a first scan cycle of the drive electrodes, the pulses of the pen drive signal of the first pen would be phase additive, during a second scan cycle, the pulses of the pen drive signal of the first pen would be phase subtractive, and during the third through the fifth scan cycles, the pulse of the pen drive signal of the first pen would be phase additive. The code sequence is repeated during successive scan cycles.

The pen drive signal of the second pen identified by code 10101 would include a phase additive scan cycle followed by phase subtractive scan cycle, followed by a phase additive scan cycle, followed by a phase subtractive scan cycle, followed by a phase additive scan cycle. In this embodiment, each bit of the code is applied during a complete scan cycle (of all the drive electrodes) of the touch sensor. The technique of applying the code over multiple scan cycles by applying multiple pulses for each scan cycle allows for noise filtering. Using this technique, each pulse of the response signal is integrated and added to the next pulse to provide a sum of all pulses in the response signal to obtain the touch location signal with good signal to noise ratio (SNR). A (noisy) pulse having an amplitude change in the direction opposite from the other (signal) pulses would reduce the final summation, but the SNR could be maintained within a specified level. Alternatively, in the example above, coded 1's may be represented by phase additive scans and coded 0's may be represented by applying no signal from the pen.

Figure 8B:
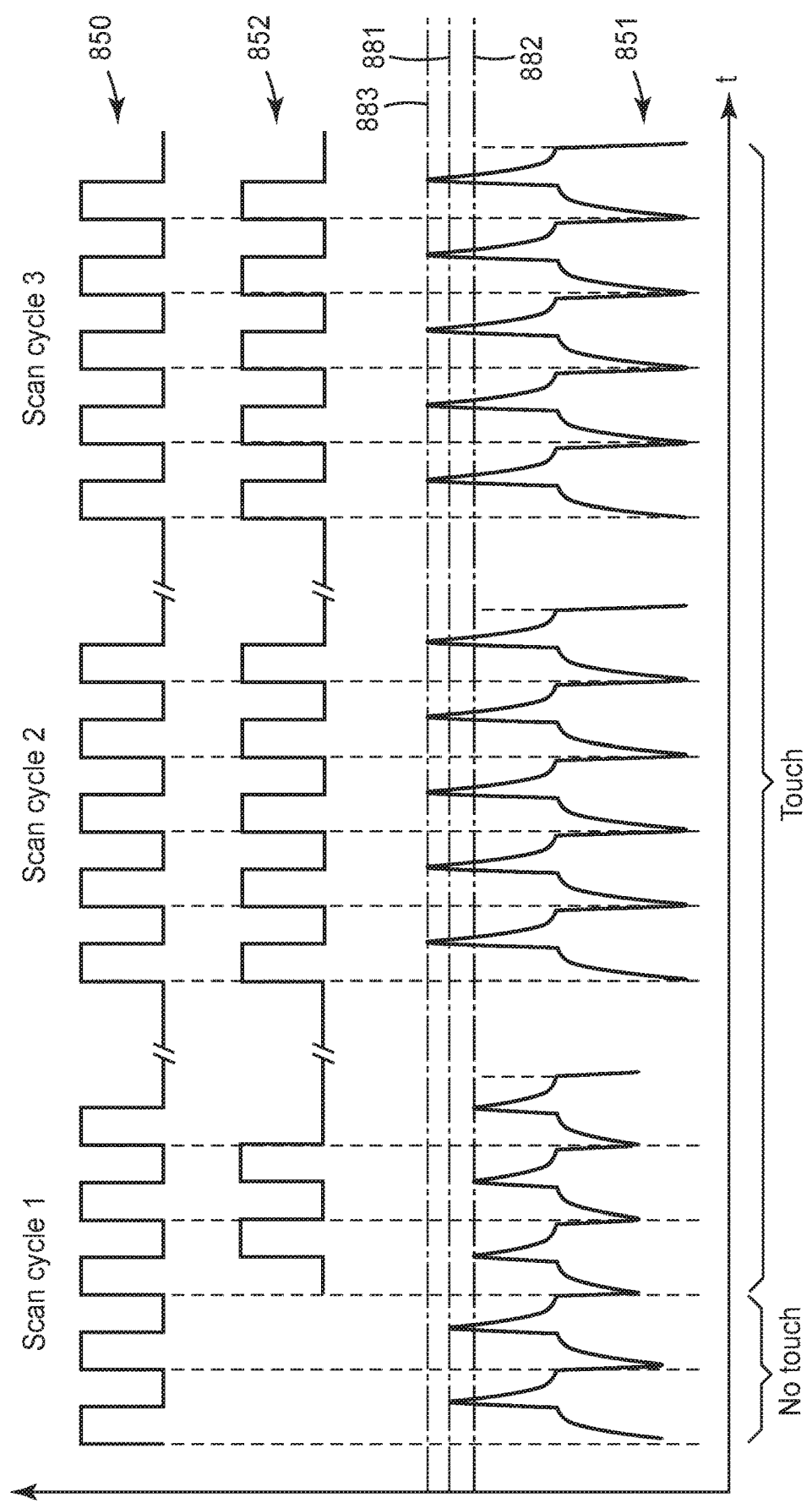

FIG. 8B shows a voltage vs. time graph of a touch sensor drive signal 850 and a corresponding voltage vs. time graph of a response signal 851 affected by a pen drive signal of an active pen. The pen emits a pen drive signal 852 that includes a code 011 identifying the pen over three scan cycles, indicated in FIG. 8B as scan cycle 1, scan cycle 2, scan cycle 3. The touch sensor drive signal 850 shows a waveform of five pulses that would be applied in sequence to each drive electrode during a scan cycle. In the no-touch portion of the response signal 851, the response signal 851 has a first amplitude 881 indicative of the absence of a touch. The touch portion of the response signal 851 includes the code in response to the code of the pen drive signal 852. During scan cycle 1, the pen drive signal 852 is a phase subtractive pulse sequence. In response, the pulses of the response signal 851 during the touch portion of scan cycle 1 have an amplitude 882 that is less than amplitude 881.

During scan cycle 2, the pen drive signal 852 is a phase subtractive pulse sequence. In response, the pulses of the response signal 851 during the scan cycle 2 have an amplitude 883 that is greater than amplitude 881. During scan cycle 3, the pen drive signal 852 is a phase subtractive pulse sequence. In response, the pulses of the response signal 851 during the scan cycle 3 have an amplitude 883 that is greater than amplitude 881.

The pen coding implemented as discussed in conjunction with FIG. 8B can be performed using two or more different pulse amplitudes in the pen drive signal. The pulses that contain the code are not limited to phase additive and phase subtractive pulses. For example the code could include phase additive pulses of two or more different amplitudes and/or could include phase subtractive pulses of two or more different amplitudes.

Figure 9:
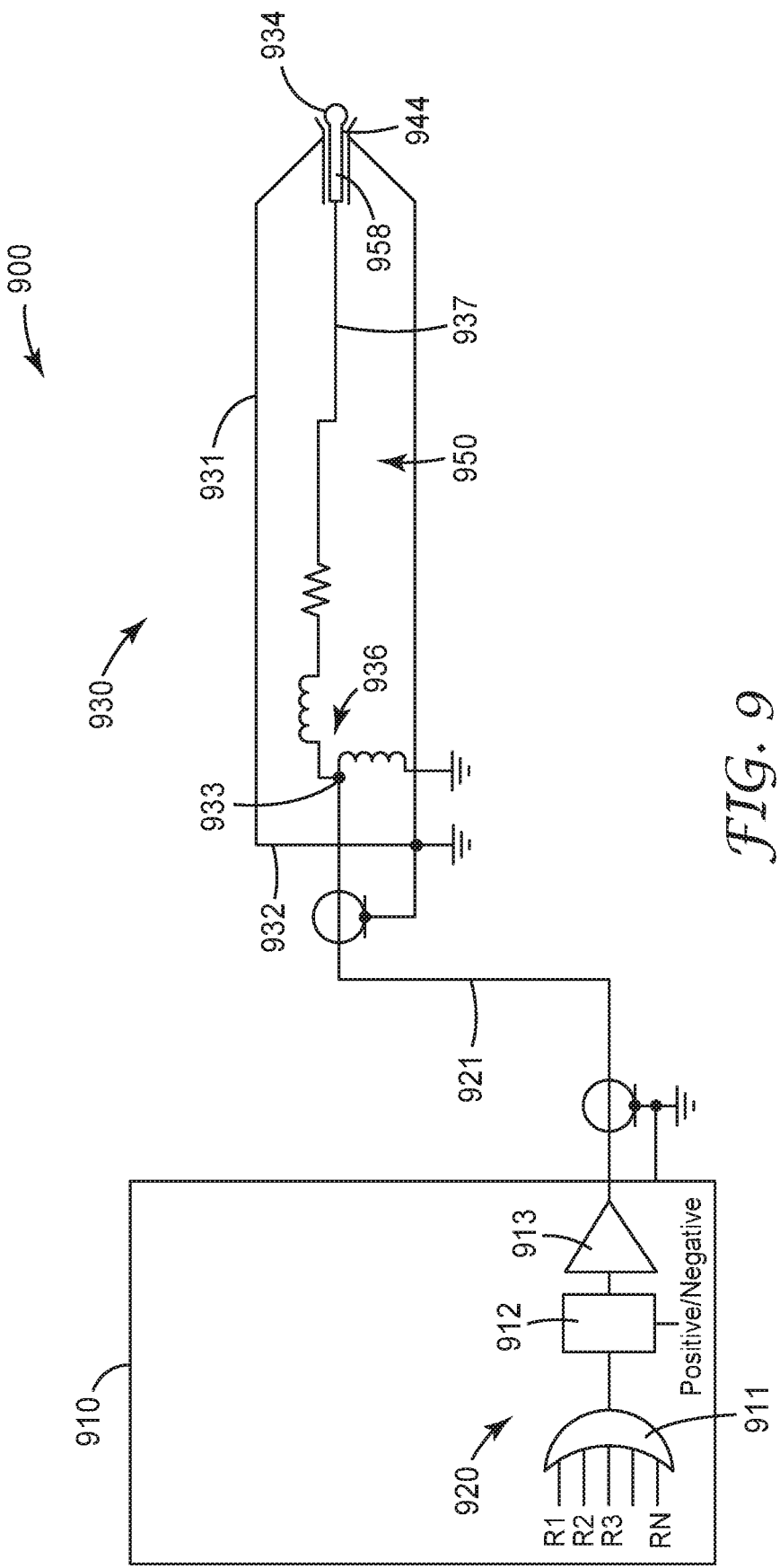
FIG. 9 illustrates a system including an active pen and a touch controller electrically coupled through a wired connection in accordance with some embodiments.

FIG. 9 illustrates a system 900 including an active pen 930 and a touch controller 910 in accordance with some embodiments. The pen 930 includes a pen body 932 and electronic circuitry 950 disposed within the pen body 932. The pen body 932 include a base portion 931 that may be made of metal or other electrically conductive material having a cross sectional shape with a diameter of about 6 mm, for example. The pen body includes a tip 934 that is electrically insulated from the pen body 932. Electrical insulation 944 is disposed between the tip and other portions of the pen body 932. As shown in FIG. 9, electrically conductive portions of the pen body 932 may be grounded to form an electrostatic shield for the tip 934. In some embodiments, an electrostatic shield may be arranged between the tip and other portions of the pen body. The tip 934 is configured to make physical contact with the touch sensing surface. The tip 934 may have a touch contact diameter of about 1.5 to about 2.5 mm, for example.

As shown in FIG. 9, the touch controller 910 of the touch sensor is coupled to the pen 930 by a wire 921, e.g., a single wire shielded cable. The touch controller 910 includes synchronization circuitry 920 configured to generate a synchronization signal that includes information about the frequency and phase of the touch drive signals of the touch controller. As shown in FIG. 9, the synchronization circuitry 920 can include an adder 911 that sums the touch drive signals R1, R2, . . . RN applied to the drive electrodes of the touch sensor. In some cases, a first drive signal applied to a first drive electrode, e.g., R1, includes five pulses, a second drive signal applied to a second drive electrode, e.g., R2 includes another five pulses, continuing to the Nth drive signal applied to the Nth drive electrode. In some cases, drive signals applied to different drive electrodes may have a different number of pulses. Each drive signal may be customized by the touch sensor controller.

Optionally, the touch controller includes an inverting switch 912 that can invert the signal from the adder 911 so that the synchronization signal is either in phase or out of phase with the touch sensor drive signal. The pen drive signal provided by the pen will be either in phase or out of phase with the touch sensor drive signal depending on the phase of the synchronization signal. A positive/negative control line of the inverting switch 912 controls the phase of the synchronization signal and thus controls the phase of the pen drive signal. In some alternative embodiments, an inverting switch may be located in the pen, e.g., disposed within the pen body, rather than in the touch controller. The output from the inverting switch 912 is amplified by amplifier 913 and the synchronization signal is carried to the pen via wire 921. The inverting switch can be used to generate the identification pulse sequence over several row scans.

The pen circuitry 950 receives the synchronization signal via the wire at connection 933, which embodies a simple form of a receiver circuit. The pen circuitry 950 shown in FIG. 9 includes pen drive signal generator circuitry comprising a boost transformer 936 that is configured to boost the synchronization signal received by the touch sensor. The boost amplifier 936 may boost the signal by a factor of about ten, for example. The pen circuitry brings the pen drive signal to the pen tip by conductor 937 and connection 938, which serve as emitter circuitry in this simple case. When the synchronization signal is in phase with the touch sensor drive signals, the pen 930 emits a pen drive signal emitted through the pen tip 934 that has the same frequency and phase as the touch sensor drive signal, but with a larger amplitude.

The boost transformer 936 may cause the amplitude of the pen drive signal to be about ten times greater than the touch sensor drive signal, or on the order of about 100 V peak-to-peak, for example. The amplitude of the pen drive signal may be adjustable. The pen drive signal, e.g., a 100V peak-to-peak signal, has an amplitude (optionally adjustable) that is sufficient to affect the response signal at a node formed by an addressed drive electrode. The pen drive signal is insufficient to affect the response signal at nodes formed by non-addressed drive electrodes at least in part because the non-addressed drive electrodes are grounded by the controller. The touch sensor active drive electrode is driven with the touch sensor drive voltage, for example, 5 to 10 pulses with a 20V-50V positive pulse from ground.

When the pen touches the touch sensing surface at a touch location near a node and the controller drives a drive electrode at the touch location, the touch sensor drive signal and the pen drive signal add together at the receive electrode of the node. A pulse that is out of phase with respect to the phase of the touch sensor drive signal, e.g., 180° out of phase, is phase subtractive and subtracts from the touch sensor drive signal producing a response signal similar to a finger touch. As an example, the amplitude of a touch response signal that is produced by the combined touch sensor drive signal and a phase subtractive pen drive signal may be about 20% less than the amplitude of a response signal that is not registering a touch.

A pulse having the same phase as the phase of the touch sensor drive signal is phase additive and adds to the touch sensor drive signal. The amplitude of a touch response signal that is produced by the combined touch sensor drive signal and a phase additive pen drive signal may be about 20% greater than the amplitude of a response signal that is not registering a touch. In some configurations, the controller is configured to discriminate the response signal produced by a pen having a phase additive pen drive signal and a response signal produced by a finger touch or palm touch based on the amplitude of the response signal. This allows separate processing for pen and finger touches and reduction of palm effects.

In some embodiments, the pen drive signal includes a code that identifies the pen. For example, the pen circuitry 950 may optionally include code circuitry that stores the pen code and inserts the code, e.g., sequence of coded pulses, into the pen drive signal emitted by the pen. In some embodiments, multiple pens used concurrently with the touch sensor can be identified by their respective codes. The insertion of the code into the pen drive over multiple row scans can be timed based on the scan cycle used by the touch sensor controller.

Figure 10:
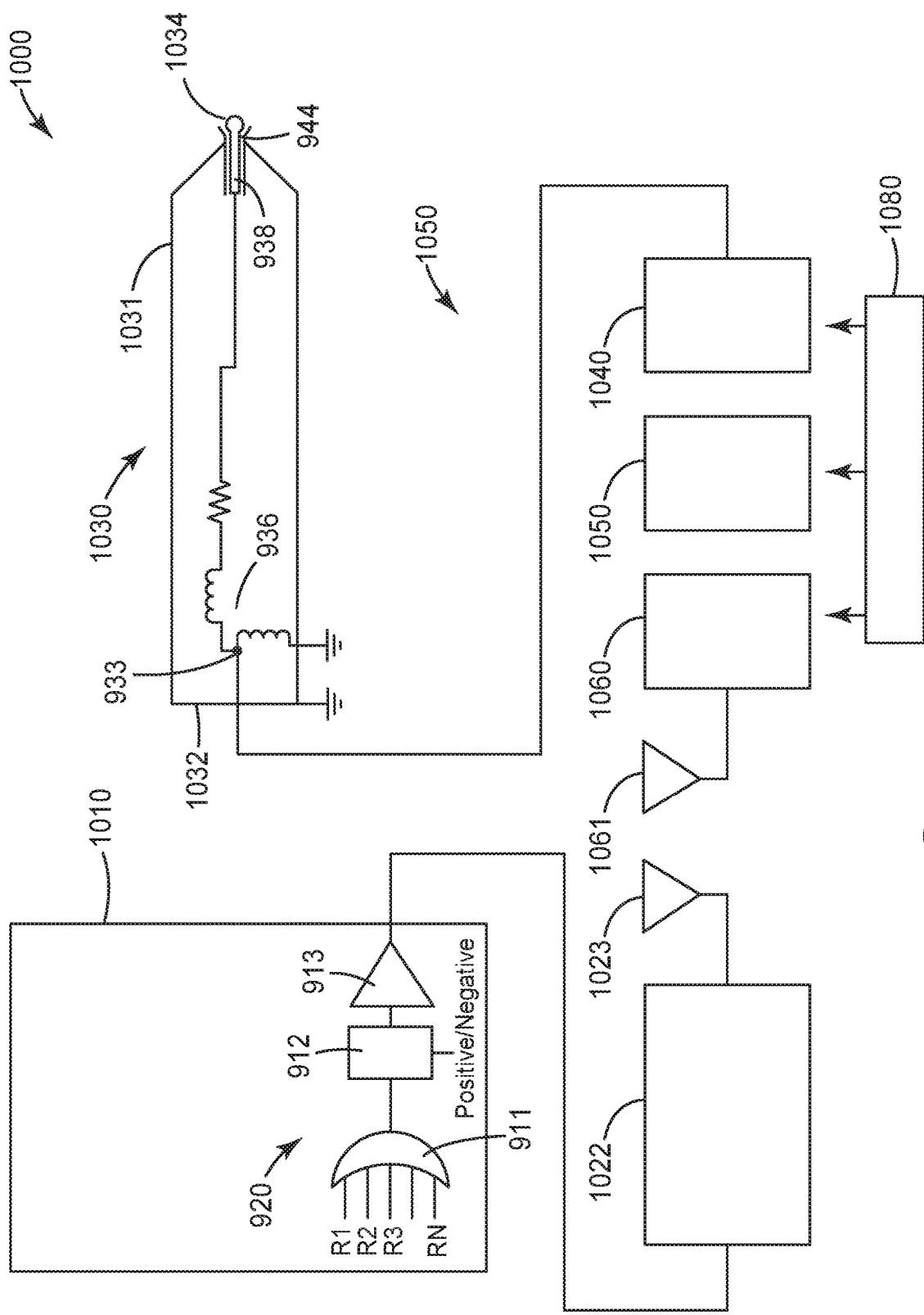
FIG. 10 illustrates a system including an active pen coupled to a touch controller coupled through a wireless connection in accordance that is similar in many respects to the system of FIG. 9.

FIG. 10 illustrates a system 1000 that is similar in some respects to the system illustrated in FIG. 9 except that the touch controller circuitry 1010 and the pen circuitry include components that provide a wireless connection between the touch sensor controller and pen. FIG. 10 illustrates a system 1000 including an active pen 1030 and a touch controller 1010 in accordance with some embodiments. The pen 1030 includes a pen body 1032 and electronic circuitry 1050 disposed within the pen body 1032. The pen body 1032 includes a base portion 1031 that may be made of metal or other electrically conductive material having a cross sectional shape with a diameter of about 6 mm, for example. The pen body includes a tip 1034 that is electrically insulated from the pen body 1032. As illustrated in FIG. 10, electrical insulation 1044 is disposed between the tip 1034 and other portions of the pen body 1032. Electrically conductive portions of the pen body may be grounded to form a shield for the tip. In some embodiments, an electrostatic shield may be arranged between the tip and other portions of the pen body. The tip 934 is configured to make physical contact with the touch sensing surface and may have a touch contact diameter of about 1.5 to about 2.5 mm, for example.

In the system 1000 shown in FIG. 10 the touch sensor controller 1010 and the active pen 1030 are coupled via a wireless connection that carries the synchronization signal to the pen receiver 1060. The touch sensor controller includes a modulator 1022 that modulates a carrier signal with the touch drive signal producing an amplitude modulated (AM) radio frequency (RF) synchronization signal. The synchronization signal is transmitted through antenna 1023 to the pen 1030.

The pen includes a pen body 1032 that includes a pen tip 1034 and a base portion 1031. Pen circuitry 1050 is disposed at least partially within the pen body 1032 which at least partially encloses the pen circuitry 1050. The RF signal transmitted by the touch controller is received in the receiver circuitry of the pen 1030 comprising an antenna 1061 and RF receiver 1060. The pen circuitry 1050 includes a demodulator 1070 coupled to the receiver 1060 and configured to demodulate the RF signal and to extract the demodulated synchronization signal. The pen circuitry 1050 may include a buffer amplifier 1040 and/or other signal processing circuitry, e.g., filters, to condition the demodulated synchronization signal received from the touch sensor controller 1010. As previously discussed, the pen circuitry 1050 can include a boost transformer 1036 that boosts the signal, e.g., by a factor of about 10, for example.

The pen 1030 provides a pen drive signal based on the received synchronization signal. As previously discussed, the pen drive signal may be a phase additive signal, having the same frequency and phase as the touch sensor drive signal but with a larger amplitude. The pen drive signal may be emitted through the pen tip 1034 to the touch sensor.

In some embodiments, the pen drive signal includes a code that identifies the pen. For example, the pen circuitry 1050 may include code circuitry that stores the pen code and inserts the code, e.g., sequence of coded pulses, into the pen drive signal emitted by the pen over multiple row drive cycles. In some embodiments, multiple pens used concurrently with the touch sensor can be identified by their respective codes. The insertion of the code into the pen drive signal can be timed based on the scan cycle used by the touch sensor controller.

The pen 1030 includes a power supply 1080 configured to supply power to the pen circuitry. The power supply includes an energy storage device, e.g., battery or supercapacitor, may include power conditioning circuitry, e.g., voltage regulators, capacitors, etc. In some cases, the pen 1030 may include a force and/or slide switch that provides power to the pen by connecting the power to the pen circuitry 1050 when the pen tip 1034 is pushed with a force greater than a threshold force.

Figure 11:
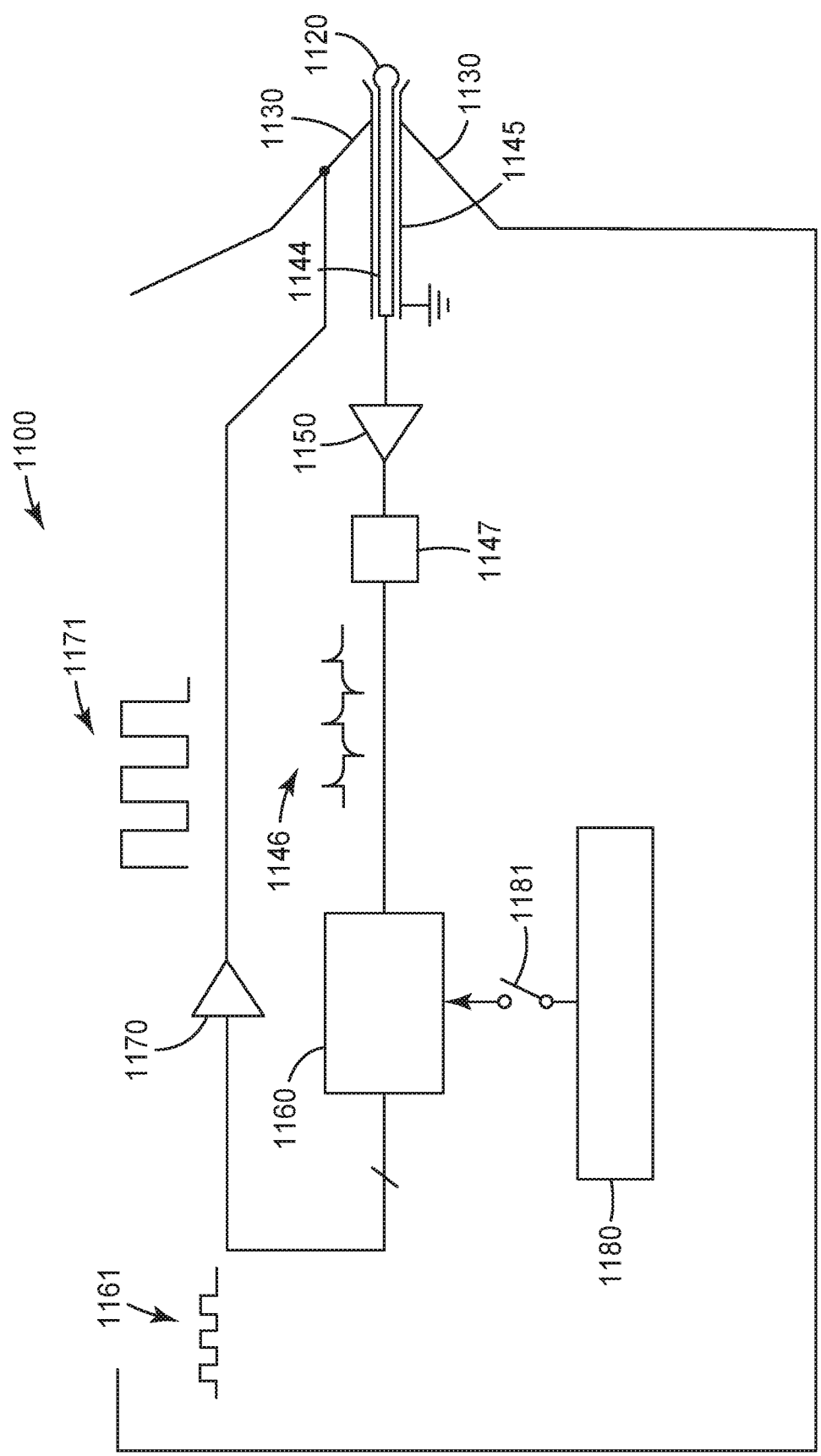
FIGS. 11 and 12 illustrate untethered pens configured to sense touch sensor drive signals applied to drive electrodes and to generate pen drive signals based on the sensed touch sensor drive signals.

FIG. 11 illustrates a pen 1100 configured for use with a touch controller. The pen 1100 is capable of sensing touch sensor drive signals as they are applied to the touch drive electrodes. The sensed touch drive signals form the synchronization signal for the pen.

As previously discussed, in some embodiments, the pen body includes a receiver portion configured to receive the synchronization signals and an emitter portion configured to emit the pen drive signal. In the embodiment illustrated by FIG. 11, the receiver portion of the pen body includes the pen tip 1120 that picks up the touch sensor drive signals present on the drive electrodes when the pen tip touches or comes in close proximity to the touch sensing surface. The emitter portion of the pen body comprises the pen cone 1130. The pen tip 1120 is insulated from the pen cone 1130 by electrical insulation material 1144 disposed between the tip and the cone and can be electrostatically shielded by a grounded sleeve 1145 that isolates the pen tip 1120 from cone 1130 and and/or other pen components.

The pen receiver circuitry may include an operational amplifier 1150 coupled to the pen tip 1120. When the pen tip is capacitively coupled to the touch sensor, the output of the operational amplifier 1150 includes differentiated positive and negative pulses 1146 corresponding to the rising and falling edges of the touch drive signal. The pen tip 1120 may also pick up noise, e.g., from the drive signals and/or power supply of a liquid crystal display (LCD). Thus, the receive circuitry may also include one or more filters 1147 configured to reject noise from the sensed signal.

The pen 1100 includes pen drive signal generator circuitry 1160 configured to generate a pen drive signal, e.g., a square wave, based on the positive and negative pulses, the pen drive signal having the frequency and phase of the touch sensor drive signal.

In some cases, the signal generator comprises an analog or digital phase lock loop and the output of the operational amplifier receiver is coupled to the phase lock loop which generates a low level pen drive signal 1161. If the phase lock loop is digital, it may be controlled by a microcontroller. The phase lock loop generates the pen drive signal 1161 by converting an output 1146 of the pen receive circuitry to a signal 1161 having the frequency and phase of the touch sensor drive signal.

In some implementations, the touch drive signal is a sequence of about five to ten pulses for each drive electrode. The touch controller scans through the drive electrodes by applying pulse sequence of the drive signal to each drive electrode in a pattern with a scan time interval between the pulse sequences applied to different drive electrodes and a refresh interval between successive scans.

A digital phase lock loop can count the time between edges of the differentiated positive and negative pulses 1146 output by the receive circuitry (illustrated as op amp 1150 and filter 1147 in FIG. 11) and create a timing diagram for the touch sensor. The clock of the phase lock loop is synchronized to the touch controller refresh interval between successive scans of the drive electrodes. The pen senses movement of the pen on the touch sensing surface and generates the pen drive signal based on the touch sensor drive signal present in the local pen touch area. The pen circuitry emulates the timing of the touch sensor scanning circuitry and the phase lock loop reproduces the scan timing of the touch sensor. Using this technique, the pen circuitry can anticipate when a drive signal will scan by the touch location.

In some embodiments, if the pen 1100 touches the touch sensing surface in between the location of two adjacent drive electrodes, the pen tip will sense the drive signals on both the adjacent drive electrodes. The pen generates and emits a pen drive signal that is based on both drive signals present on the adjacent electrodes. Thus, response signals at the receive electrodes that form the nearest intersection nodes with the drive electrodes can be used by the touch controller to interpolate the touch location when the touch sensing surface is touched between drive electrodes.

The low level pen drive signal 1161 generated by the phase lock loop 1160 (or other pen drive generator circuitry) may be input to a buffer amplifier 1170 that increases the amplitude of pen drive signal, e.g., to about 25 to 100 volts peak-to-peak. The pen 1100 emits the amplified pen drive signal 1171 through the emitter portion 1130 of the pen body, which comprises the cone in the embodiment of FIG. 11. Depending on the phase of the pen drive signal 1171 with respect to the phase of the touch drive signal, the pen drive signal may capacitively couple to a receive electrode of the touch sensor in a phase additive mode or a phase subtractive mode as previously discussed.

In some embodiments, the pen drive signal includes a code that identifies the pen. For example, the pen circuitry may include code circuitry that stores the pen code and inserts the code, e.g., the code may be a sequence of coded pulse trains corresponding to a sequence of touch sensor drive signals, into the pen drive signal emitted by the pen. In some embodiments, multiple pens used concurrently with the touch sensor can be identified by their respective codes. The insertion of the code into the pen drive signal can be timed based on the scan cycle used by the touch sensor controller to drive the touch sensor drive electrodes.

The pen 1100 includes a power supply 1180 configured to supply power to the pen circuitry. The power supply includes an energy storage device, e.g., battery or supercapacitor, may include power conditioning circuitry, e.g., voltage regulators, capacitors, etc. In some cases, the pen 1100 may include a force and/or slide switch 1181 that connects power supply to the pen circuitry when the pen tip 1120 is pushed with a force greater than a threshold force.

Figure 12:
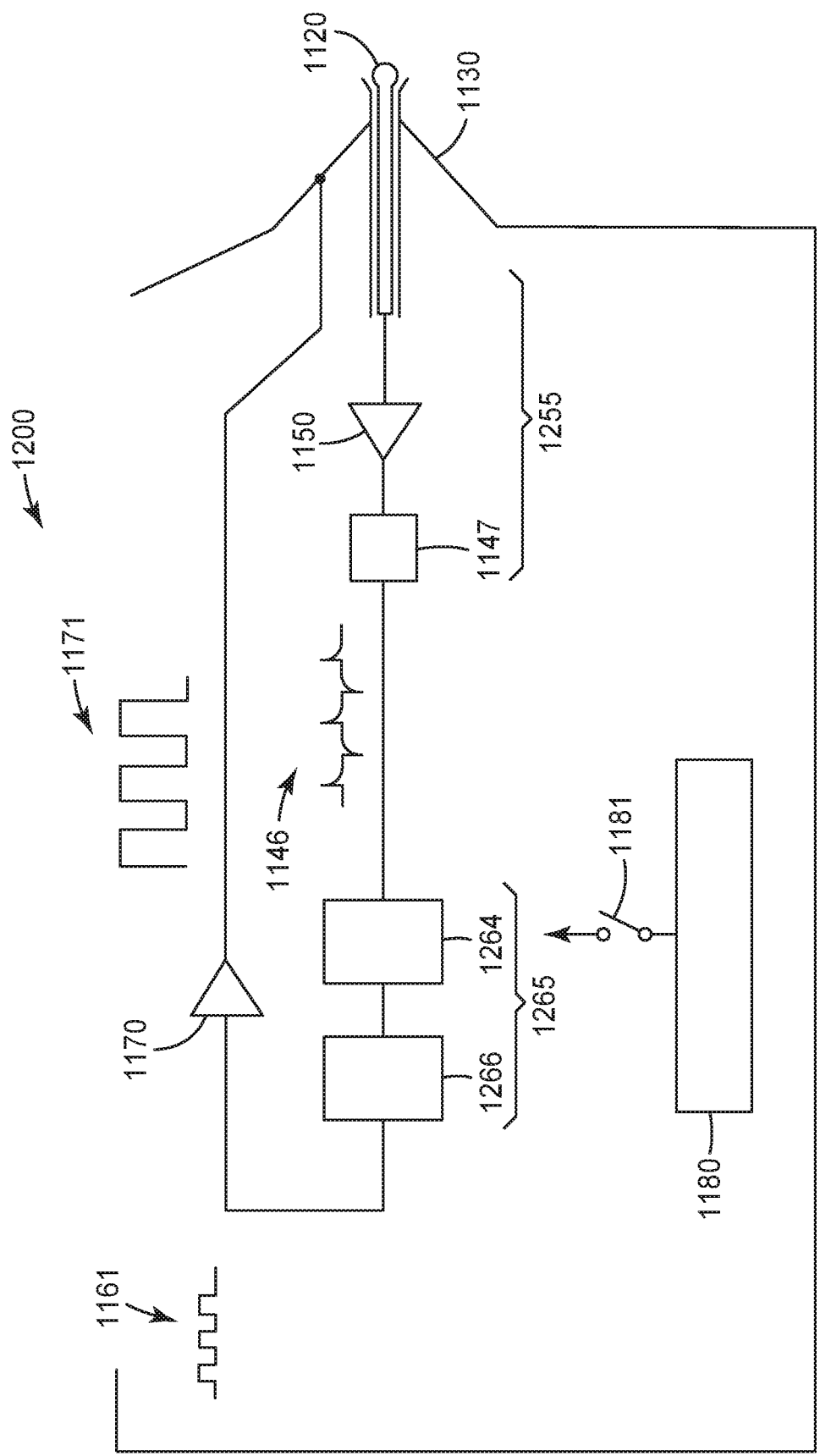

FIG. 12 illustrates a pen 1200 that is similar in many respects with the pen 1100 of FIG. 11. The pen drive signal generator circuitry 1265 shown in FIG. 12 includes a voltage comparator 1264 and pulse generator 1266 in place of the phase lock loop described in connection with FIG. 11. Embodiments using a phase lock loop and a voltage comparator/pulse generator as a signal generator for the pen drive signal are described in conjunction with FIGS. 11 and 12, respectively. It will be appreciated that any circuitry capable of generating a signal having frequency and phase of the touch sensor drive signal based on a received synchronization signal can be used as the signal generator for the pen. The voltage comparator 1264 operates on the signal from the receive circuitry 1255 of the pen 1200. As shown in FIG. 12, the receive circuitry 1255 includes filters 1147 configured to attenuate noise in the signal received from the touch sensor. The voltage comparator 1264 triggers on the positive and negative edges of the received signal 1146 and defines the positive and negative transitions of the pen drive signal. For example, the comparator 1464 may be fast with less than 1 μsec delay. The comparator output may be input to a pulse generator 1266 that regenerates the low level square wave pen drive signal 1161. As previously discussed, the low level pen drive signal 1161 is amplified by a buffer amplifier 1170 and the amplified signal 1171 is emitted through the pen cone 1130. Particularly in embodiments in which the pen circuitry includes more sophisticated electronics such as a micro controller, the pen may include additional features such as a blue tooth interface and/or an accelerometer that can be used to detect an orientation of the pen.

Figure 13:
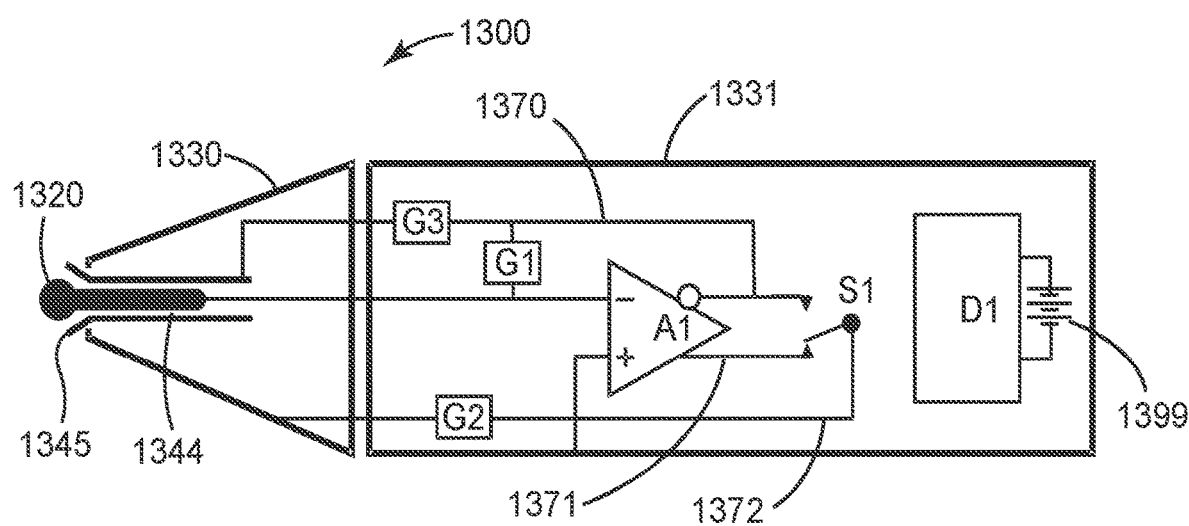
FIG. 13 is a simplified schematic of an untethered pen that converts synchronization signals to pen drive signals using amplification.

FIG. 13 is a simplified schematic of an untethered pen 1300 that converts synchronization signals to pen drive signals using amplification through amplifier A1. Pen 1300 is divided into four electrically isolated sections; tip 1320 that receives signals from a touch sensor, cone 1330 that emits pen drive signals, and pen body 1331 that provides a local ground reference to amplifier A1, and driven shield 1345. Amplifier A1 has differential outputs. A1 receives signals from tip 1320 and amplifies these signals, providing inverting output 1370 and non-inverting output 1371. The gain of amplifier A1 is controlled by feedback element G1 which is some embodiments may be a resistor, or resistor and capacitor in parallel. A portion of signal 1370 is applied to driven shield 1345. The portion of the signal applied to the shield 1345 is controlled by gain block G3 which may be a resistor divider.

Switch S1 controls the drive signal that is applied to cone 1330. If switch S1 connects to signal 1370, then cone 1330 will be driven by signal 1370 having opposite-phase from the received signal, resulting in diminished effective capacitive coupling between sensor drive electrodes and receive electrodes that are proximate cone 1330, as described above. If switch S1 connects to signal 1371, then cone 1330 will be driven by signal 1371 having the same phase as the received signal, resulting in increased effective capacitive coupling between sensor drive electrodes and receive electrodes that are proximate cone 1330. Gain block G2 controls the magnitude of the signal that drives cone 1330. Gain block G2 may be an attenuator, providing a gain less than one, or it may boost signal 1372 using, for example, a transformer similar to 936.

Driving shield 1345 with a negative feedback signal can be used to achieve consistent gain from amplifier A1 during changes in operating mode, and it can reduce positive feedback from cone 1330 to tip 1320, enhancing stability of the amplifier circuit. Amplifier A1 is shown as a feedback operational amplifier, although other circuit configurations may be used including fixed gain differential amplifiers or combinations of amplifiers that provide in-phase and out-of-phase signals.

Linear amplifier A1 and gain G1 may be replaced by one of several other alternative circuits including: a comparator whose opposite phase outputs are switched in when the input signal exceeds a threshold; a window comparator whose opposite phase outputs are switched in when the input signal exceeds one of positive or negative thresholds; a pulse width modulator (PWM) whose opposite-phase outputs vary in pulse width in proportion to the input signal. Where pulse feedback is employed, positive feedback problems may be mitigated by inserting delay between each detected edge of the touch sensor drive signal and generation of a pulse. The connection from pen tip 1320 to the PWM may also be disabled during the leading edge of each PWM-generated pulse, to reduce unintended feedback to the input of the PWM through pen tip 1320.

FIG. 13 shows tip 1320 connected as a signal receiver and cone 1330 as a signal emitter. These functions can be reversed so tip 1320 is the signal emitter and cone 1330 as a signal receiver, or pen body 1331 may be the receiver and cone 1330 may be the ground reference (signal reference) for amplifier A1. Those skilled in the art can envision other arrangements.

In some implementations, the pen includes two pen emitter portions that are driven with opposite phase pen drive signals, as illustrated in FIG. 13. As shown in FIG. 13, a pen may be configured to receive the touch drive signal using one electrode, (e.g. the tip) and to emit pen drive signals via two pen electrodes. In FIG. 13, the shield is driven with a first pen drive signal that is an out-of-phase signal (phase subtractive with respect to the touch sensor drive signal) and the cone is driven with an in-phase signal (phase additive with respect to the touch sensor drive signal).

In some configurations, positive feedback between a closely spaced emitter and receiver may be of concern. The configuration of FIG. 13 may serve to reduce positive feedback that could occur due to the amplified in-phase signal emitted, e.g., at the cone. The amplified signal at the cone may couple to the tip, causing the amplifier to oscillate due to positive feedback. A shield around the tip may be insufficient to resolve the issue of positive feedback if the shield is simply tied to the pen local ground. However, a shield that is driven by a signal that is out of phase with the input will link negative feedback to the tip. When the negative feedback is greater than the positive feedback that couples from the cone, the amplifier will remain stable. FIG. 13 shows gains G2 and G3 that would be arranged to provide a net negative feedback from the amplifier output to the tip. According to this approach, positive signal coupling from cone to tip would be cancelled by the negative signal from the shield. Cancellation of the positive signal coupling from cone to tip could be achieve at least in part by adjusting G2 and G3 appropriately, and also due to the physical configuration where signals on the shield couple more strongly to the tip due to the shield's position between the tip and the cone.

The physical size of the cone vs. the shield will cause the cone to couple much more strongly to the touch sensor, so the sensor electrodes will receive much more positive signal from the cone than negative signal from the shield.

Positive feedback may not be an issue if the pen circuitry includes a sufficient delay between detecting an edge of the touch sensor drive signal and sending for the next edge. The delay may be adjusted to avoid positive feedback.

Pen 1300 may have additional circuits D1 to control switch S1 and to perform other functions in pen 1330. Pen 1330 may comprise additional functions such as user-operated switches, tip pressure measurement, pen status monitoring, and RF communication with a host computer. Where pen 1330 is untethered, a battery 1399 may provide power to pen circuits.

Embodiments disclosed herein include:

Item 1. A pen for use with a touch sensor, comprising:
a pen body including a pen tip that is configured to make contact with the touch sensor, the pen body comprising:
an electrically conductive receiver portion; and
an electrically conductive emitter portion, the emitter portion electrically insulated and electrostatically shielded from the receiver portion; and electronic circuitry configured to:
receive a touch sensor drive signal applied to a drive electrode of the touch sensor through the receiver portion of the pen body;
generate a pen drive signal that is phase additive with the touch sensor drive signal; and
emit the pen drive signal through the emitter portion of the pen body.

Item 2. The pen of item 1, wherein the emitter portion includes at least a portion of the pen tip.

Item 3. The pen of any of items 1 through 2, wherein the receiver portion includes a first portion of the pen tip and the emitter portion includes a second portion of the pen tip.

Item 4. The pen of item 1, wherein the pen body includes a cone proximate to the pen tip and the receiver portion comprises the pen tip and the emitter portion comprises the cone.

Item 5. The pen of any of items 1 through 4, further comprising a force switch configured to provide power to the electronic circuitry of the pen when a force above a threshold level is applied to the pen tip.

Item 6. The pen of any of items 1 through 5, wherein the electronic circuitry of the pen includes an amplifier configured to amplify the touch drive signal received from the touch sensor.

Item 7. The pen of item 6, wherein an output of the amplifier comprises differentiated positive and negative pulses.

Item 8. The pen of item 7, wherein the electronic circuitry of the pen is configured to detect the positive and negative pulses and to convert the positive and negative pulses to a signal having frequency and phase of the touch drive signal.

Item 9. The pen of any of items 7 through 8, wherein the electronic circuitry of the pen includes a phase lock loop configured to convert an output of the amplifier to a signal having frequency and phase of the touch drive signal.

Item 10. The pen of any of items 1 through 9, wherein the electronic circuitry of the pen is configured to output a pen drive signal that is phase additive with touch sensor drive signals present at first and second touch sensor drive electrodes if the tip touches the touch sensor at a location between the touch sensor drive electrodes.

Item 11. The pen of any of items 1 through 11, wherein the pen drive signal includes a code that identifies the pen.

Item 12. A pen for use with a touch sensor, comprising:
a pen body;
receiver circuitry configured to receive a synchronization signal from the touch sensor;
signal generator circuitry configured to generate a pen drive signal based on the synchronization signal, the pen drive signal including a code that identifies the pen; and
emitter circuitry configured to emit the pen drive signal, the pen configured to capacitively couple the pen drive signal to a receive electrode of the touch sensor when the pen touches the touch sensor proximate to the receive electrode.

Item 13. The pen of item 12, wherein:
the pen body includes an electrically conductive pen tip; and
the emitter circuitry is coupled to the pen tip, the pen tip configured to make physical contact with the touch sensor to capacitively couple the pen drive signal to the receive electrode.

Item 14. The pen of item 12, wherein:
the pen body comprises an electrically conductive pen tip; and
the receiver circuitry is coupled to a the pen tip, the pen tip configured to make physical contact with the touch sensor to capacitively couple one or more touch sensor drive signals applied to one or more touch sensor drive electrodes to the receiver circuitry through the pen tip.

Item 15. The pen of any of items 12 through 14, wherein:
the receiver circuitry is coupled to an electrically conductive receiver portion of the pen body; and the emitter circuitry is coupled to an electrically conductive emitter portion of the pen body that electrically insulated and electrostatically shielded from the receiver portion.

Item 16. The pen of any of items 12 through 15, wherein the synchronization signal is a sum of each of the touch drive signals of the touch sensor.

Item 17. The pen of any of items 12 through 16, wherein the receiver circuitry is coupled to the touch sensor through a wired connection that carries the synchronization signal.

Item 18. The pen of any of items 12 through 16, wherein the receiver circuitry is coupled to the touch sensor through a wireless connection that carries the synchronization signal.

Item 19. The pen of item 18, wherein:
 the receiver circuitry is coupled to the touch sensor wirelessly through a radio frequency (RF) signal;
 the RF signal carries the synchronization signal; and
 the receiver circuitry comprises an RF demodulator configured to demodulate the RF signal.

Item 20. The pen of any of items 12 through 19, wherein an amplitude of the pen drive signal is adjustable.

Item 21. The pen of any of items 12, through 20 further comprising a force switch configured to connect the circuitry of the pen to a power source when a force above a threshold level is applied to a tip of the pen.

Item 22. A touch sensor system, comprising:
 a touch sensor, comprising:
  a matrix of drive and receive electrodes capacitively coupled at a plurality of nodes;
  touch sensor drive circuitry configured to generate touch sensor drive signals and to apply the touch sensor drive signals to the drive electrodes;
  touch detection circuitry configured to detect a touch based on response signals present on the receive electrodes; and
  pen synchronization circuitry configured to provide a synchronization signal;
 and
 a pen for use with a touch sensor, comprising:
 a pen body including a pen tip that is configured to make contact with the touch sensor, the pen body comprising:
  an electrically conductive receiver portion; and
  an electrically conductive emitter portion, the emitter portion electrically insulated and electrostatically shielded from the receiver portion;
 and
 electronic circuitry configured to:
  receive a touch sensor drive signal applied to a drive electrode of the touch sensor through the receiver portion of the pen body;
  generate a pen drive signal that is phase additive with the touch sensor drive signal; and
  emit the pen drive signal through the emitter portion of the pen body.

Item 23. A touch sensor system, comprising:
 a touch sensor, comprising:
  a matrix of drive and receive electrodes capacitively coupled at a plurality of nodes;
  touch sensor drive circuitry configured to generate touch sensor drive signals and to apply the touch sensor drive signals to the drive electrodes;
  touch detection circuitry configured to detect a touch based on response signals present on the receive electrodes; and
  pen synchronization circuitry configured to generate a synchronization signal;
 and
 a pen for use with the touch sensor, the pen comprising:
  receiver circuitry configured to receive the synchronization signal from the touch sensor;
  signal generator circuitry configured to generate a pen drive signal based on the synchronization signal, the pen drive signal including a code that identifies the pen; and
  emitter circuitry configured to emit the pen drive signal, the pen configured to capacitively couple the pen drive signal to a receive electrode of the touch sensor when the pen touches the touch sensor proximate to the receive electrode.

Item 24. A method, comprising:
 operating a pen comprising a pen body that includes an electrically conductive receiver portion and an electrically conductive emitter portion that is electrically insulated and electrostatically shielded from the receiver portion, the pen configured to capacitively couple with a touch sensor when the pen touches the touch sensor proximate to a receive electrode of the touch sensor, the operating comprising:
  receiving a touch sensor drive signal applied to at least one drive electrode of the touch sensor through the receiver portion of the of the pen body;
  converting the touch sensor drive signal to a pen drive signal that is phase additive with the touch sensor drive signal; and
  emitting the pen drive signal through the emitter portion of the pen body.

Item 25. The method of item 24, wherein:
 receiving the touch sensor drive signal through the receiver portion comprises receiving the touch sensor drive signal through a tip of the pen; and
 emitting the pen driver signal through the emitter portion comprise emitting the pen driver signal through a cone of the pen.

Item 26. The method of item 24, wherein:
 receiving the touch sensor drive signal through the receiver portion comprises receiving the touch sensor drive signal through a cone of the pen; and
 emitting the pen driver signal through the emitter portion comprise emitting the pen driver signal through a tip of the pen.

Item 27. The method of any of items 24 through 27, wherein the pen drive signal contains a code that identifies the pen.

Item 28. A method, comprising:
 operating a pen configured to capacitively couple with a touch sensor when the pen is proximate to a receive electrode of the touch sensor, the operating comprising:
  receiving a synchronization signal from the touch sensor;
  generating a pen drive signal based on the synchronization signal, the pen drive signal including a code that identifies the pen; and
  emitting the pen drive signal.

Item 29. The method of item 28, wherein generating the pen drive signal comprises:
 generating a drive portion of the pen drive signal, the drive portion comprising a sequence of pulses that are phase additive to a drive signal of the touch sensor; and
 generating a code portion of the pen drive signal, the code portion comprising at least one pulse that is phase subtractive to the touch sensor drive signal.

Item 30. The method of item 28, wherein generating the pen drive signal comprises:
 generating a drive portion of the pen drive signal, the drive portion comprising a sequence of pulses that are phase subtractive to a drive signal of the touch sensor; and
 generating a code portion of the pen drive signal, the code portion comprising at least one pulse that is phase additive to the touch sensor drive signal.

Item 31. The method of item 28, wherein generating the pen drive signal comprises:
generating a drive portion of the pen drive signal, the drive portion comprising a sequence of pulses that are either phase additive or phase subtractive to a drive signal of the touch sensor; and
generating a code portion of the pen drive signal, the code portion comprising at least one pulse that neither adds to nor subtracts from the touch sensor drive signal.

Item 32. The method of any of items 28 through 31, wherein generating the pen drive signal comprises generating the pen drive signal that includes one bit of the code for each scan cycle of the touch sensor drive signal.

Item 33. The method of any of items 28 through 32, wherein receiving the synchronization signal from the touch sensor comprises receiving the synchronization signal through a wired connection.

Item 34. The method of any of items 28 through 32, wherein receiving the synchronization signal from the touch sensor comprises receiving the synchronization signal through a wireless connection.

Item 35. The method of any of items 28 through 34, wherein providing the pen drive signal based on the synchronization signal comprises boosting an amplitude of the pen drive signal to be about 10 times greater than the touch sensor drive signal.

Item 36. The method of any of items 28 through 35, further comprising adjusting an amplitude of the pen drive signal to be a predetermined multiple of the touch sensor drive signal.

Item 37. The method of any of items 28 through 36, further comprising:
sensing a force applied to the tip; and
providing power to the pen based on the force applied to the tip.

Item 38. A pen for use with a touch sensor, comprising:
a pen body including a pen tip that is configured to make contact with the touch sensor, the pen body comprising-first and second electrically conductive emitter portions; and
pen circuitry configured to emit a first pen drive signal through the first emitter portion of the pen body and to emit a second pen drive signal having a phase opposite to the first pen drive signal through the second emitter portion.

Item 39. The pen of item 38, wherein:
the pen body further comprises a receiver portion that is electrically insulated and electrostatically shielded from the first and second emitter portions; and
the pen circuitry comprises receiver circuitry configured to receive a touch sensor drive signal applied to a drive electrode of the touch sensor through the receiver portion of the pen body.

Various modifications and alterations of the embodiments disclosed herein will be apparent to those skilled in the art. For example, the reader should assume that features of one disclosed embodiment can also be applied to all other disclosed embodiments unless otherwise indicated.

The invention claimed is:

1. A touch sensor system, comprising:
a touch sensor, comprising:
a matrix of drive and receive electrodes capacitively coupled at a plurality of nodes;
touch sensor drive circuitry configured to generate touch sensor drive signals and to apply the touch sensor drive signals to the drive electrodes;
touch detection circuitry configured to detect a touch based on response signals present on the receive electrodes; and
pen synchronization circuitry configured to provide a synchronization signal; and
a pen for use with a touch sensor, comprising:
a pen body including a pen tip that is configured to make contact with the touch sensor, the pen body comprising:
an electrically conductive receiver portion; and
an electrically conductive emitter portion, the emitter portion
electrically insulated and electrostatically shielded from the receiver portion; and
electronic circuitry configured to:
receive a touch sensor drive signal applied to a drive electrode of the touch sensor through the receiver portion of the pen body;
generate a pen drive signal that is phase additive with the touch sensor drive signal; and
emit the pen drive signal through the emitter portion of the pen body.

2. A touch sensor system, comprising:
a touch sensor, comprising:
a matrix of drive and receive electrodes capacitively coupled at a plurality of nodes;
touch sensor drive circuitry configured to generate touch sensor drive signals and to apply the touch sensor drive signals to the drive electrodes;
touch detection circuitry configured to detect a touch based on response signals present on the receive electrodes; and
pen synchronization circuitry configured to generate a synchronization signal; and
a pen for use with the touch sensor, the pen comprising:
receiver circuitry coupled to an electrically conductive receiver portion of the pen and configured to receive the synchronization signal from the touch sensor;
signal generator circuitry configured to generate a pen drive signal based on the synchronization signal, the pen drive signal including a code that identifies the pen; and
emitter circuitry coupled to an electrically conductive emitter portion of the pen that is electrically insulated and electrostatically shielded from the receiver portion, the emitter circuitry configured to emit the pen drive signal, the pen configured to capacitively couple the pen drive signal to a receive electrode of the touch sensor when the pen touches the touch sensor proximate to the receive electrode.

3. A method, comprising:
operating a pen comprising a pen body that includes an electrically conductive receiver portion and an electrically conductive emitter portion that is electrically insulated and electrostatically shielded from the receiver portion, the pen configured to capacitively couple with a touch sensor when the pen touches the touch sensor proximate to a receive electrode of the touch sensor, the operating comprising:
receiving a touch sensor drive signal applied to at least one drive electrode of the touch sensor through the receiver portion of the of the pen body;
converting the touch sensor drive signal to a pen drive signal that is phase additive with the touch sensor drive signal; and
emitting the pen drive signal through the emitter portion of the pen body.

4. The method of claim 3, wherein:
receiving the touch sensor drive signal through the receiver portion comprises receiving the touch sensor drive signal through a tip of the pen; and
emitting the pen driver signal through the emitter portion comprise emitting the pen driver signal through a cone of the pen.

5. The method of claim 3, wherein:
receiving the touch sensor drive signal through the receiver portion comprises receiving the touch sensor drive signal through a cone of the pen; and
emitting the pen driver signal through the emitter portion comprise emitting the pen driver signal through a tip of the pen.

6. A method of, comprising:
operating a pen configured to capacitively couple with a touch sensor when the pen is proximate to a receive electrode of the touch sensor, the operating comprising:
receiving a synchronization signal from the touch sensor;
generating a pen drive signal based on the synchronization signal, the pen
drive signal including a code that identifies the pen; and
emitting the pen drive signal, wherein generating the pen drive signal comprises:
generating a drive portion of the pen drive signal, the drive portion comprising a sequence of pulses that are either phase additive or phase subtractive to a drive signal of the touch sensor; and
generating a code portion of the pen drive signal, the code portion comprising at least one pulse that neither adds to nor subtracts from the touch sensor drive signal.

7. A pen for use with a touch sensor, comprising:
a pen body including a pen tip that is configured to make contact with the touch sensor, the pen body comprising- first and second electrically conductive emitter portions; and
pen circuitry configured to emit a first pen drive signal through the first emitter portion of the pen body and to emit a second pen drive signal having a phase opposite to the first pen drive signal through the second emitter portion.

8. The pen of claim 7, wherein:
the pen body further comprises a receiver portion that is electrically insulated and electrostatically shielded from the first and second emitter portions; and
the pen circuitry comprises receiver circuitry configured to receive a touch sensor drive signal applied to a drive electrode of the touch sensor through the receiver portion of the pen body.

* * * * *